(12) United States Patent
Ikeda et al.

(10) Patent No.: US 6,985,419 B2
(45) Date of Patent: Jan. 10, 2006

(54) TRACKING CONTROL METHOD AND STORAGE APPARATUS

(75) Inventors: Toru Ikeda, Kawasaki (JP); Shigenori Yanagi, Kawasaki (JP); Takashi Masaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 10/047,139

(22) Filed: Jan. 15, 2002

(65) Prior Publication Data

US 2002/0181347 A1 Dec. 5, 2002

(30) Foreign Application Priority Data

May 30, 2001 (JP) .............................. 2001-163254

(51) Int. Cl.
*G11B 7/00* (2006.01)
(52) U.S. Cl. .............................. 369/53.23; 369/44.32; 369/44.28; 369/53.11; 369/53.22
(58) Field of Classification Search ............. 369/44.32, 369/44.28, 53.22, 53.23, 53.18, 53.14, 53.11, 369/53.28
See application file for complete search history.

(56) References Cited

U.S. PATENT DOCUMENTS

| 4,893,201 | A | * | 1/1990 | Emori et al. ............. 360/77.04 |
| 5,109,306 | A | * | 4/1992 | Mase et al. .............. 360/77.04 |
| 5,345,434 | A |   | 9/1994 | Ide et al. ................... 369/124 |
| 5,418,770 | A |   | 5/1995 | Ide et al. ................... 369/116 |
| 5,513,165 | A |   | 4/1996 | Ide et al. ................... 369/116 |
| 5,590,111 | A |   | 12/1996 | Kirino et al. .............. 369/116 |
| 5,642,343 | A |   | 6/1997 | Toda et al. ................... 369/54 |
| 5,732,055 | A |   | 3/1998 | Masaki et al. ................ 369/54 |
| 5,732,061 | A |   | 3/1998 | Kirino et al. ............... 369/116 |
| 5,808,989 | A | * | 9/1998 | Ueki et al. ............... 369/47.11 |
| 5,898,654 | A |   | 4/1999 | Shimada et al. ......... 369/44.32 |
| 6,067,284 | A |   | 5/2000 | Ikeda et al. ................ 369/116 |
| 6,101,053 | A | * | 8/2000 | Takahashi .................... 360/46 |
| 6,115,338 | A |   | 9/2000 | Masaki et al. ................ 369/54 |
| 6,339,567 | B1 | * | 1/2002 | Shimamoto et al. ...... 369/44.35 |
| 6,363,039 | B2 | * | 3/2002 | Hayashi et al. .......... 369/44.32 |
| 6,434,096 | B1 | * | 8/2002 | Akagi et al. .............. 369/44.32 |
| 6,894,957 | B1 |   | 5/2005 | Shimada .................. 369/44.32 |

FOREIGN PATENT DOCUMENTS

| JP |   | 04265532 | A | * | 9/1992 |
| JP |   | 6-84173 |   |   | 3/1994 |
| JP |   | 07050019 | A | * | 2/1995 |
| JP |   | 8-45081 |   |   | 2/1996 |
| JP |   | 9-293259 |   |   | 11/1997 |
| JP |   | 10283645 | A | * | 10/1998 |
| JP |   | 11-16251 |   |   | 1/1999 |
| JP |   | 11016172 | A | * | 1/1999 |
| JP |   | 11-73669 |   |   | 3/1999 |

(Continued)

*Primary Examiner*—W. R. Young
*Assistant Examiner*—Jorge L. Ortiz-Criado
(74) *Attorney, Agent, or Firm*—Greer, Burns & Crain, Ltd.

(57) ABSTRACT

A tracking control method measures an optimum offset by measuring a light beam irradiation state of a light beam while offsetting a tracking target position of the light beam on a recording medium so that an optimum light beam irradiation state is obtained at the tracking target position, and carries out a tracking control by setting the measured optimum offset.

18 Claims, 18 Drawing Sheets

FOREIGN PATENT DOCUMENTS

| | | |
|---|---|---|
| JP | 11-144252 | 5/1999 |
| JP | 2000-132855 | 5/2000 |
| JP | 2000-182292 | 6/2000 |
| JP | 2000-187855 | 7/2000 |
| JP | 2000-200435 | 7/2000 |
| JP | 2000187855 A * | 7/2000 |
| JP | 2000-251257 | 9/2000 |
| JP | 2000-357337 | 12/2000 |

* cited by examiner

INNER PERIPHERAL DIRECTION →

A: Buffer 0
B: Buffer 1
C: Spare
D: Buffer 2
E: Test
F: Buffer 3
G: Buffer 4

TRACKING CONTROL METHOD AND STORAGE APPARATUS

BACKGROUND OF THE INVENTION

This application claims the benefit of a Japanese Patent Application No. 2001-163254 filed May 30, 2001, in the Japanese Patent Office, the disclosure of which is hereby incorporated by reference.

1. Field of the Invention

The present invention generally relates to tracking control methods and storage apparatuses, and more particularly to a tracking control method for recording and/or reproducing information with respect to an optical recording medium with a desired recording and/or reproducing margin, and to a storage medium which employs such a tracking control method.

In magneto-optical disk units, there are magneto-optical disk units which record and/or reproduce information with respect to a land of the magneto-optical disk, and there are magneto-optical disk units which record and/or reproduce information with respect to both a land and a groove of the magneto-optical disk. By employing the so-called land-groove recording system which records and/or reproduces information with respect to both the land and the groove of the magneto-optical disk, it is possible to increase the recording density on the magneto-optical disk.

2. Description of the Related Art

In an optical recording medium, typified by the magneto-optical disk, which has a narrow track pitch and employs the land-groove recording system, there is a possibility that a signal reproducing performance of a target track will be deteriorated by signal interference from signals written on tracks adjacent to the target track.

It is known that one cause of the signal interference at the time of the reproduction is a radial tilt, that is, an inclination of an optical axis in a radial direction with respect to a recording surface (reflection surface) of the optical recording medium. When the radial tilt exists, aberration is generated in a light beam, and a reproduced signal becomes easily affected by the interference of the signals from the adjacent tracks. Normally, in a state where the radial tilt is small, a center of a tracking error signal (TES) becomes a minimum point of a read error rate, and thus, a tracking target position need only be set to the center of the TES. On the other hand, in a state where the radial tilt is large, it is known that the minimum point of the read error rate is a point where the tracking target position is shifted in one direction from the center of the TES.

The track pitch of the conventional optical recording medium is relatively large. For this reason, it is possible to obtain a sufficient recording and/or reproducing margin even if the tracking target position is set to the center of the TES. However, as the storage capacity of the optical recording medium increases and the track pitch is reduced, it may be anticipated that the effects of the radial tilt will further increase.

As a means of solving these problems, proposals have been made on a tilt correcting mechanism which mechanically corrects the relative position and angle between an optical head and the optical recording medium. But when a new mechanism such as the tilt correcting mechanism is added to the existing structure of the storage apparatus, both the structure and control of the storage apparatus become complex, and the storage apparatus becomes expensive.

Therefore, the effects of the radial tilt become more conspicuous as the track pitch of the optical recording medium is further reduced, and there is a problem in that the recording and/or reproducing margin of the conventional storage apparatus may become considerably deteriorated. In addition, there is a problem in that providing the tilt correcting mechanism will make both the structure and control of the storage apparatus complex and also make the storage apparatus expensive.

SUMMARY OF THE INVENTION

Accordingly, it is a general object of the present invention to provide a novel and useful tracking control method and storage apparatus, in which the problems described above are eliminated.

Another and more specific object of the present invention is to provide a tracking control method and storage apparatus, which can secure a desired recording and/or reproducing margin without providing a tilt correcting mechanism or the like.

Still another object of the present invention is to provide a tracking control method comprising the steps of (a) measuring an optimum offset by measuring a light beam irradiation state of a light beam while offsetting a tracking target position of the light beam on a recording medium so that an optimum light beam irradiation state is obtained at the tracking target position; and (b) carrying out a tracking control by setting the optimum offset measured by the step (a). According to the tracking control method of the present invention, it is possible to secure a desired recording and/or reproducing margin without providing a tilt correcting mechanism or the like. In addition, by measuring the optimum offset, it is possible to position the light beam to the optimum tracking target position even when a tilt is generated, so that the recording and/or reproducing process can be carried out at an highly accurate position, to thereby realize a high-density recording and/or reproduction.

A further object of the present invention is to provide a storage apparatus comprising offset measurement control means for measuring an optimum offset by measuring a light beam irradiation state of a light beam while offsetting a tracking target position of the light beam on a recording medium so that an optimum light beam irradiation state is obtained at the tracking target position; and tracking control means for carrying out a tracking control by setting the optimum offset which is updated. According to the storage apparatus of the present invention, it is possible to secure a desired recording and/or reproducing margin without providing a tilt correcting mechanism or the like. In addition, by measuring the optimum offset, it is possible to position the light beam to the optimum tracking target position even when a tilt is generated, so that the recording and/or reproducing process can be carried out at an highly accurate position, to thereby realize a high-density recording and/or reproduction.

Another object of the present invention is to provide a storage apparatus comprising a measuring section which measures an optimum offset by measuring a light beam irradiation state of a light beam while offsetting a tracking target position of the light beam on a recording medium so that an optimum light beam irradiation state is obtained at the tracking target position; and a control section which carries out a tracking control by setting the optimum offset measured by the measuring means. According to the storage apparatus of the present invention, it is possible to secure a desired recording and/or reproducing margin without providing a tilt correcting mechanism or the like. In addition, by measuring the optimum offset, it is possible to position the light beam to the optimum tracking target position even when a tilt is generated, so that the recording and/or reproducing process can be carried out at an highly accurate position, to thereby realize a high-density recording and/or reproduction.

Other objects and further features of the present invention will be apparent from the following detailed description when read in conjunction with the accompanying drawings.

DESCRIPTION OF THE PREFERRED EMBODIMENTS

Figure 1:
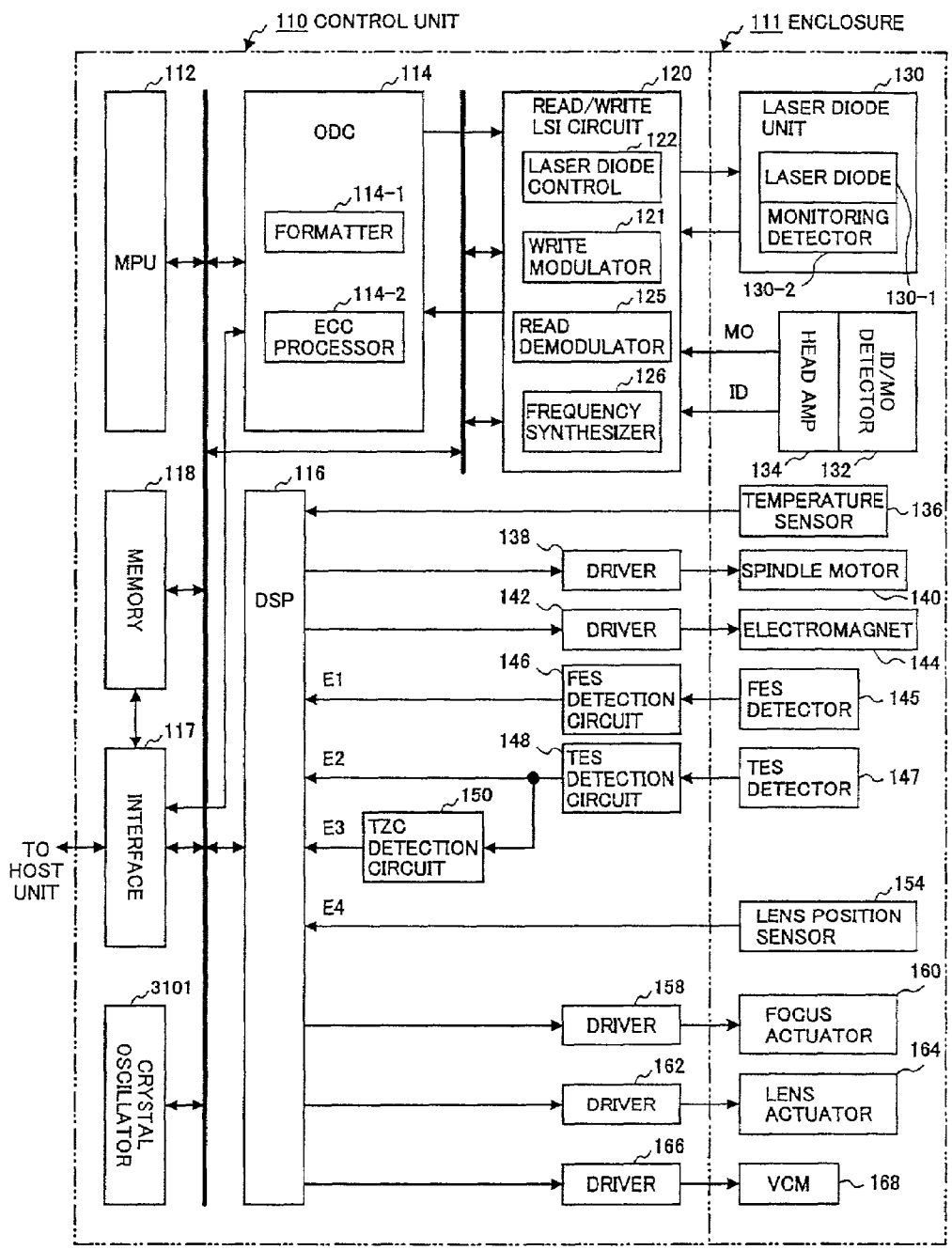
FIG. 1 is a system block diagram showing a structure of a first embodiment of a storage apparatus according to the present invention.

A description will be given of a first aspect of the present invention. In a storage apparatus provided with a means for offsetting a tracking target position and a means for measuring a number of bit errors for test write (read error rate), the present invention writes the data for three or more consecutive tracks in a test write region of an optical recording medium. At a center track which is sandwiched between two adjacent tracks which are written with the data, the read error rate is measured while offsetting the tracking target position. The read error rate deteriorates by increasing the offset of the tracking target position in a positive or negative direction about an optimum tracking target position. When a relationship between the tracking target position and the error rate is plotted, an approximately U-shaped curve is obtained. For example, a center of two tracking target positions where the error rate exceeds a prescribed value is detected, and a detected result is stored in a memory as the optimum offset of the tracking target position. When carrying out a reproducing process thereafter, this optimum offset of the tracking target position is applied to a servo loop to carry out the reproduction.

According to this first aspect of the present invention, the data is written on three or more consecutive tracks. During this data write, a write power may be increased by a prescribed amount with respect to an optimum write power which is obtained by the test write, so that signal interference is more easily generated and the approximately U-shaped curve is made narrower so as to make a center thereof more conspicuous. In this case, at least the adjacent tracks on both sides of the track on which the read error is detected is written at the increased write power.

In other words, the write power may be increased by the prescribed amount with respect to the optimum write power, so as to more easily generate the signal interference.

The prescribed amount by which the optimum write power is increased may be set in a vicinity of a difference between the optimum write power of the user track and the optimum write power of the write test track which are known in advance. Alternatively, the write power may be increased by a write retry process, so as to increase the optimum write power by an amount corresponding to this increase. Accordingly, the optimum write power can also be used to confirm the amount of signal leak from the adjacent tracks at the user track on which the user data is actually written.

The conventional test write process is carried out to obtain the optimum write power, and the approximately U-shaped curve of the write power versus the read error rate is detected by measuring the write power versus the read error rate on the test track. In the present invention, the center of the approximately U-shaped curve is regarded as the optimum write power, and a power immediately before the error rate begins to become large as the write power is reduced with respect to the optimum write power is stored as a minimum write power. In addition, in a case where the data is recorded by increasing the write power by a prescribed amount and the width of the approximately U-shaped curve when the optimum tracking target position is obtained is narrower than a prescribed width or, the error rate does not become less than or equal to a prescribed error rate, it is possible to carry out an operation of making the measurement again by reducing the optimum write power, writing the data at the write power which is increased by a prescribed amount with respect to the reduced optimum write power and making the measurement. The optimum write power may be reduced to the minimum write power obtained by the test write process. On the other hand, if the width of the approximately U-shaped curve is too wide compared to the prescribed width, the prescribed amount by which the write power is increased when writing the data on the adjacent tracks is further increased when writing the data, so as to make the measurement again.

When measuring the read error rate, the optimum read power is increased by the prescribed amount. However, in a case where the width of the approximately U-shaped curve when the optimum tracking target position is obtained is narrower than a prescribed width or, the error rate does not become less than or equal to a prescribed error rate, it is possible to reduce the read power. On the other hand, if the width of the approximately U-shaped curve is too wide compared to the prescribed width, it is also possible to increase the read power.

The optimum tracking position which is obtained by the above described measurement is an optimum condition at the time of the reproduction. But by carrying out in advance the write operation in a state where the offset is made in a direction opposite to the measured result, it is possible to set the optimum tracking target position closer to the center at the time of the reproduction. It is desirable that an amount of the offset during this write operation is not the optimum tracking target position obtained according to the first aspect of the present invention described above taken in an opposite direction (opposite sign), but a value which is reduced by a prescribed ratio or prescribed amount.

The optimum tracking target position may be measured for every zone or, in units of areas, where one area is made up of a plurality of zone groups on the optical recording medium. In this case, the measured result corresponding to each zone or area may be stored in a memory. The stored measured result can be read from the memory and used during the write or read (recording or reproducing) process.

Furthermore, the optimum offset of the tracking target position corresponding to each rotary angle during one revolution of the optical recording medium may be stored in a memory and used for the correction. In this case, the optimum offset may be managed in units of sectors corresponding to the same rotary angle or, in units of sector groups each made up of a plurality of sectors (units of prescribed rotary angle), and the optimum offset may be measured with respect to each sector or sector group and stored in the memory the form of a table corresponding to one revolution of the optical recording medium. In the correction process during one revolution of the optical recording medium, it is possible to carry out a control so that the optimum offset of the tracking target position in steps and stored in the memory in the form of the table is smoothly and continuously corrected.

A transition of the optimum offset of the tracking target position corresponding to each rotary angle during one revolution of the optical recording medium can also be estimated from the surface fluctuation of the optical recording medium. In this case, a displacement of a focus actuator corresponding to an amount of focus control is detected, and the optimum offset can be estimated from the transition state of the displacement. The displacement of the focus actuator can be calculated from a driving current of the focus actuator during the focus control, using the characteristic of the focus actuator such as a driving current versus displacement characteristic. In the correction process during one revolution of the optical recording medium, the correction is made using a preset optimum offset correction coefficient of the tracking target position with respect to the surface fluctuation of the optical recording medium. In this case, the above described measuring and correcting operations become unnecessary, to thereby permit reduction of the measuring time. Furthermore, the measured result obtained measuring the optimum offset of the tracking target position for an integer multiple of one revolution of the optical recording medium is used as the center value of the correcting amount.

Alternatively, an absolute position of the focus actuator, which can be calculated from a D.C. driving current of the focus actuator during the focus control, can be used as the center value of the correcting amount. In this case, it is necessary to measure the correcting data using a reference optical recording medium when starting the storage apparatus at the factory and to prestore the correcting data in the memory.

It is desirable that the time and temperature are managed for each area of the optical recording medium, and that the process of measuring the optimum offset of the tracking target position is carried out again when the elapsed time and/or the amount of temperature change from the previous process reaches a prescribed value or greater. Particularly in a state immediately after the optical recording medium is loaded into the storage apparatus, there is a possibility that the temperature measurement cannot be made correctly. Hence, a reference value for the elapsed time management is set short, so that the readjustment is made more frequently immediately after the loading of the optical recording medium.

When an error is generated during the reproduction, it is possible to carry out the reproducing process again by changing the offset of the tracking target position in a positive or negative direction by a prescribed amount from the optimum value. In such a retry process, the number of successful reproductions by the offset to the positive or negative direction may be counted and statistically processed, so as to carry out a learning process which shifts the optimum offset of the tacking target position in the positive or negative direction depending on the success rate. The learning process does not count the successful reproductions during a verify process after the write, so that such counting is not reflected to the statistical process.

In the verify process after the write, it is possible to correct the optimum offset by the offset which is obtained by reducing the optimum offset of the tracking target position by a prescribed amount or a prescribed ratio.

When carrying out the reproducing process using the optimum offset of the tracking target position, it is possible to set the optimum offset of the tracking target position of the area depending on the target track address of the seek. The addition of the offset is made by gradually increasing the offset until a prescribed offset is reached after the seek ends, so as not to make the tracking control unstable. In addition at the start of the seek, it is possible to apply an offset in a range which will not deteriorate the seek pull-in performance, and gradually increase the offset until the prescribed offset is reached for the remaining amount to the optimum offset of the tracking target position after the seek operation ends. In this case, as long as the optimum offset of the tracking target position of the target track is within the range which will not deteriorate the seek pull-in performance, the optimum offset of the tracking target position is added at the start of the seek, and the addition of the offset after the seek becomes unnecessary. By gradually increasing the offset after the seek, the time from the start of the seek until the addition of the offset ends increases, and the apparent seek time becomes long. Accordingly, it is desirable that the time in which the optimum offset of the tracking target position is added to the actual seek time, for use in the rotation correcting calculation.

Therefore, according to the present invention, it is possible to realize a tracking control method and storage apparatus which can secure a desired recording and/or reproducing margin without providing a tilt correcting mechanism or the like.

Next, a description will be given of embodiments of a tracking control method according to the present invention and a storage apparatus according to the present invention, by referring to the drawings.

FIG. 1 is a system block diagram showing the structure of a first embodiment of the storage apparatus according to the present invention. As shown in FIG. 1, the optical disk unit generally includes a control unit 110 and an enclosure 111. The control unit 110 includes a microprocessor unit (MPU) 112 which generally controls the operation of the optical disk unit, an interface 117 which exchanges commands and data between a host unit (not shown), an optical disk controller (ODC) 114 which carries out processes required to read and write data with respect to an optical disk (not shown), a digital signal processor (DSP) 116, and a memory 118. The memory 118 is used in common by the MPU 112, the ODC 114 and the interface 117, and for example, includes a dynamic random access memory (DRAM), a nonvolatile memory which stores control programs and flag information, or the like. A crystal oscillator 3101 is coupled to the MPU 112.

The ODC 114 includes a formatter 114-1 and an error correction code (ECC) processor 114-2. At the time of a write access, the formatter 114-1 divides NRZ write data into sector units of the optical disk and generates a recording format, and the ECC processor 114-2 generates and adds an ECC with respect to sector write data units and also generates and adds if necessary a cyclic redundancy check (CRC) code. Further, the ECC processor 114-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 114-2. Further, the NRZ data in sector units are connected in the formatter 114-1 so as to transfer a NRZ read data stream to the host unit.

A read/write large scale integrated (LSI) circuit 120 is provided with respect to the ODC 114. This read/write LSI circuit 120 includes a write modulator 121, a laser diode control circuit 122, a read demodulator 125 and a frequency synthesizer 126. A control output of the laser diode control circuit 122 is supplied to a laser diode unit 130 which is provided in an optical unit of the enclosure 111. The laser diode unit 130 integrally includes a laser diode 130-1 and a monitoring detector 130-2. The write modulator 121 converts the write data into the data format of the pit position modulation (PPM) recording (or mark recording) or, a pulse width modulation (PWM) recording (or edge recording).

When recording and reproducing data with respect to the optical disk using the laser diode unit 130, this embodiment uses a writable magneto-optical (MO) cartridge medium employing the PWM recording which records the data in correspondence with the existence of mark edges on the optical disk. In addition, the recording format used by the optical disk is a 2.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 112 based on pit intervals of the ID portion. The MPU 112 notifies the recognition result indicating the type of optical disk to the ODC 114. For example, the type which is recognized may include information that the optical disk is a 3.5-inch disk and has a storage capacity of 128 MB, 230 MB, 540/640 MB, 1.3 GB or 2.3 GB.

The read/write LSI circuit 120 is also provided as a read system with respect to the ODC 114. The read demodulator 125 and the frequency synthesizer 26 are provided in the read/write LSI circuit 120, as described above. An ID/MO detector 132 of the enclosure 111 detects a laser beam emitted from the laser diode 130-1 and returned via the optical disk, and a detection signal from this ID/MO detector 132 is input as an ID signal (embossed pit signal) and a MO signal to the read/write LSI circuit 120 via a head amplifier 134.

The read demodulator 125 of the read/write LSI circuit 120 includes the functions of circuits such as an automatic gain control (AGC) circuit, a filter and a sector mark detection circuit. Hence, the read demodulator 125 generates a read clock and read data from the input ID signal and MO signal, and demodulates the PWM data back into the original NRZ data. In addition, since the ZCAV system is employed, the MPU 112 controls a setting of a frequency dividing ratio with respect to the frequency synthesizer 126 of the read/write LSI circuit 120 in order to generate a clock frequency in correspondence with the zone.

The frequency synthesizer 126 is a phase locked loop (PLL) circuit having a programmable frequency divider, and generates as a read clock a reproducing reference clock having a predetermined specific frequency depending on the zone position on the optical disk. In other words, the frequency synthesizer 126 is formed by the PLL circuit having the programmable frequency divider, and in a normal mode, generates the recording and/or reproducing reference clock having a frequency fo based on fo= (m/n)fi according to a frequency dividing ratio m/n which is set by the MPU 112 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 126.

The read data demodulated in the read/write LSI circuit 120 is supplied to the read system of the ODC 114, and after carrying out the reverse conversion of the 1–7 RLL, the CRC and the ECC processes are carried out by the encoding function of the ECC processor 114-2 so as to restore the original NRZ data. Next, the formatter 114-1 connects and converts the NRZ sector data into the NRZ data stream, and this NRZ read data stream is transferred to the host unit via the memory 118 and the interface 117.

A detection signal from a temperature sensor 136 provided in the enclosure 111 is supplied with respect to the MPU 112 via the DSP 116. Based on an environmental temperature within the optical disk unit detected by the temperature sensor 136, the MPU 112 controls the light emission powers for the read, write and erase in the laser diode control circuit 122 to optimum values.

The MPU 112 controls a spindle motor 140 provided in the enclosure 111 via the DSP 116 and a driver 138. In this embodiment, since the ZCAV system is employed as the recording format of the optical disk, the spindle motor 140 is rotated at a constant speed of 3637 rpm, for example.

In addition, the MPU 112 controls an electromagnet 144 provided in the enclosure 111 via the DSP 116 and a driver 142. The electromagnet 144 is arranged on a side opposite to the side of the optical disk on which the laser beam is irradiated within the optical disk unit which is loaded with this optical disk. This electromagnet 144 supplies an external magnetic field on the optical disk at the time of the recording and erasure. In the case of the optical disk having the 1.3 GB or 2.3 GB format employing the MSR, the electromagnet 144 also supplies the external magnetic field on the optical disk at the time of the MSR reproduction.

The DSP 116 is provided with a servo function for positioning the laser beam from the laser diode 130-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 112 with respect to a host command.

In order to realize the servo function of the DSP 116, a focus error signal (FES) detector 145 is provided in the optical unit of the enclosure 111 so as to detect the laser beam emitted from the laser diode 130-1 and returned via the optical disk. A FES detection circuit 146 generates a FES E1 from a detection signal received from the FES detector 145, and inputs this FES E1 to the DSP 116.

A tracking error signal (TES) detector 147 is also provided in the optical unit of the enclosure 111 so as to detect the laser beam emitted from the laser diode 130-1 and returned via the optical disk. A TES detection circuit 148 generates a TES E2 from a detection signal received from the TES detector 147, and inputs this TES E2 to the DSP 116. The TES E2 is also input to a track zero crossing (TZC) detection circuit 150, and this TZC detection circuit 150 generates a TZC signal E3 which is input to the DSP 116.

A lens position sensor 154 is provided in the enclosure 111. This lens position sensor 154 detects a position of an object lens through which the laser beam is irradiated on the optical disk. A lens position detection signal (LPOS) E4 from the lens position sensor 154 is input to the DSP 116. The DSP 116 controls and drives a focus actuator 160, a lens actuator 164 and a voice coil motor (VCM) 168 via corresponding drivers 158, 162 and 166, so as to control the position of a beam spot formed by the laser beam on the optical disk.

Figure 2:
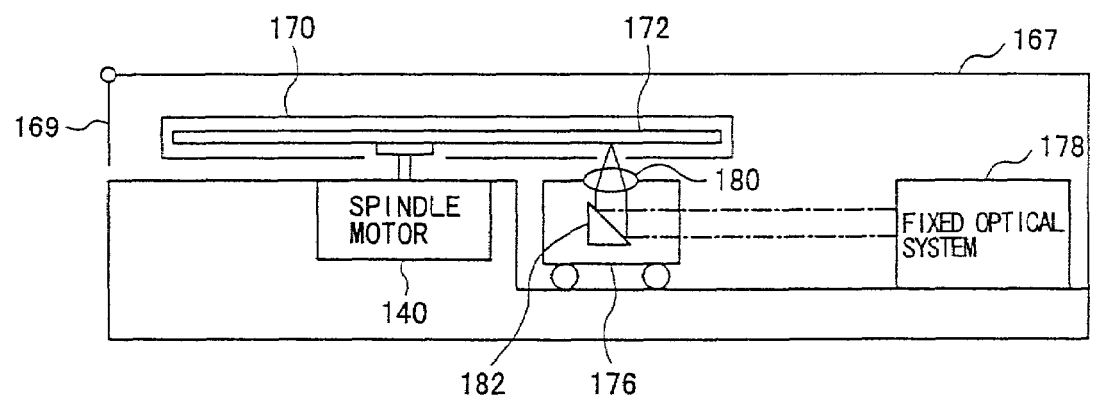
FIG. 2 is a cross sectional view showing a general structure of an enclosure.

FIG. 2 is a cross sectional view showing the general construction of the enclosure 111. As shown in FIG. 2, the spindle motor 140 is provided within a housing 167. By inserting a MO cartridge 170 into the housing 167 from the side of an inlet door 169, an optical disk (MO disk) 172 accommodated within the MO cartridge 170 engages a rotary shaft of the spindle motor 140, thereby loading the optical disk 172 with respect to the optical disk unit.

A carriage 176 is provided below the loaded optical disk 172 within the MO cartridge 170. This carriage 176 is freely movable in a direction which traverses tracks on the optical disk 172 when driven by the VCM 164. An objective lens 180 is mounted on the carriage 176. The laser beam emitted from the laser diode 130-1 which is provided within a fixed optical system 178 is reflected by a mirror 182, and is irradiated on the recording surface of the optical disk 172 via the objective lens 180, thereby forming a beam spot on the recording surface.

The movement of the objective lens 180 along an optical axis is controlled by the focus actuator 160 of the enclosure shown in FIG. 1. In addition, the objective lens 180 is movable in a radial direction which traverses the tracks on the optical disk 172 by the lens actuator 164, within a range of several tens of tracks. The position of the objective lens 180 mounted on the carriage 176 is detected by the lens position sensor 154 shown in FIG. 1. The lens position sensor 154 outputs the lens position detection signal E4 which takes a value zero at a neutral position where the optical axis of the objective lens 180 is perpendicular to the recording surface of the optical disk 172, and has a magnitude and a polarity depending on the amount the optical axis of the objective lens 180 moves towards the inner or outer peripheral side of the optical disk 172.

Figure 3:
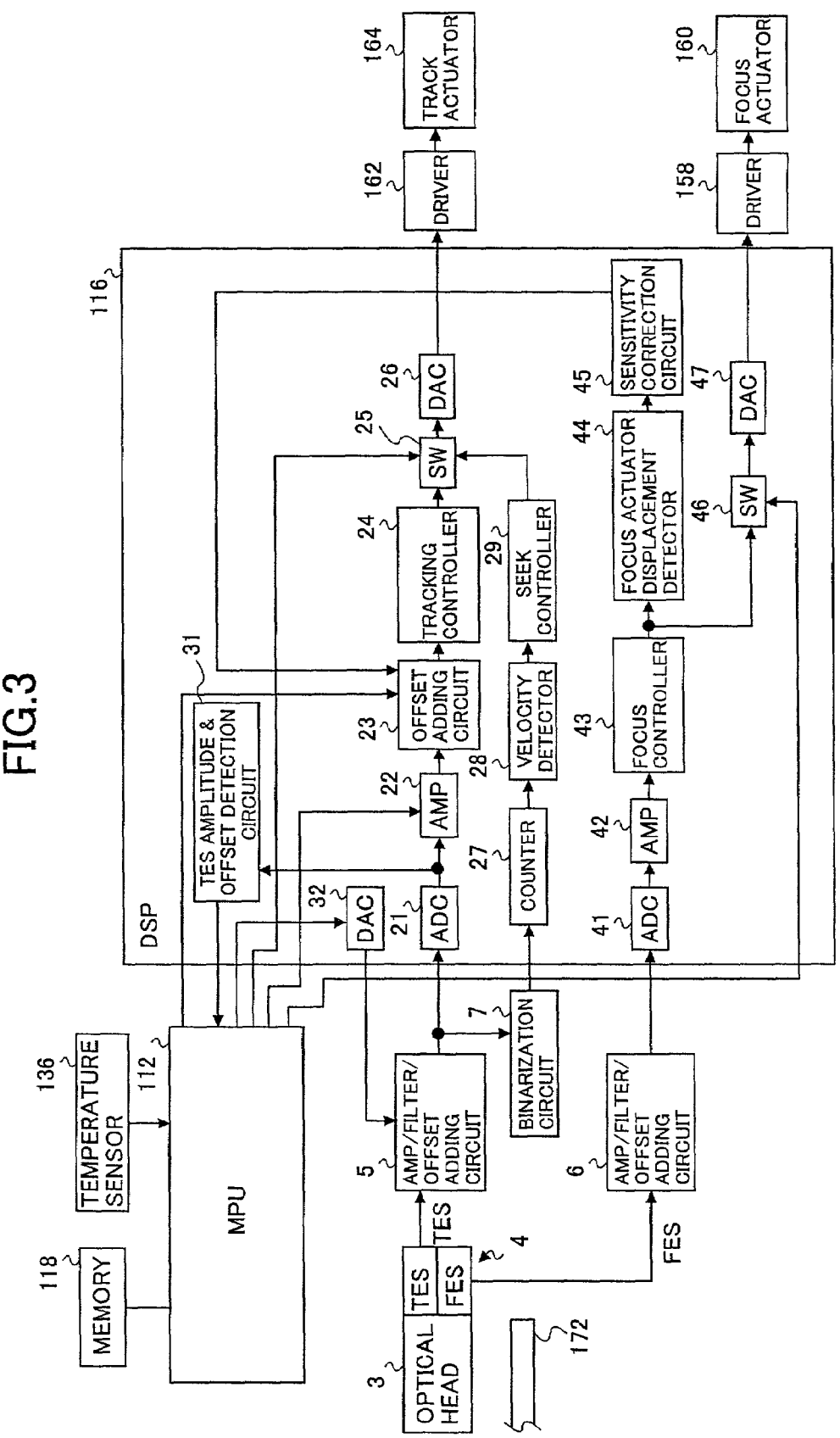
FIG. 3 is a system block diagram showing an important part of the first embodiment of the storage apparatus.

FIG. 3 is a system block diagram showing an important part of this first embodiment of the storage apparatus according to the present invention. In this first embodiment of the storage apparatus, the present invention is applied to a magneto-optical disk unit which is provided with a function of carrying out a retry process which varies a recording (write) power and makes a retry until a write is successful, such as the magneto-optical disk unit proposed in a Japanese Laid-Open Patent Application No.11-16251. In addition, this first embodiment of the storage apparatus employs a first embodiment of the tracking control method according to the present invention.

In FIG. 3, the magneto-optical disk unit generally includes the MPU 112, the digital signal processor (DSP) 116, an optical head 3 which includes a laser diode, a photodetector section 4, an amplifier and filter and offset adding circuits (amplifier/filter/offset adding circuits) 5 and 6, a binarization circuit 7, the drivers 162 and 158, the actuators 164 and 160, the memory 118 and the temperature sensor 136.

The MPU 112 controls the general operation of the entire magneto-optical disk unit. The memory 118 includes a ROM region and a RAM region. The ROM region stores programs which are executed by the MPU 112 and various data such as tables, while the RAM region stores data such as intermediate results of calculations made by the MPU 112. The temperature sensor 136 detects the temperature within the magneto-optical disk unit, and supplies a temperature detection signal to the MPU 112.

The DSP 116 generally includes an analog-to-digital converter (ADC) 21, an amplifier 22, an offset adding circuit 23, a tracking controller 24, a switching circuit 25, a digital-to-analog converter (DAC) 26, a counter 27, a velocity detector 28, a seek controller 29, a tracking error signal (TES) amplitude and offset detection circuit 31, a DAC 32, an ADC 41, an amplifier 42, a focus controller 43, a focus actuator displacement detector 44, a sensitivity correction circuit 45, a switching circuit 46, and a DAC 47. The magneto-optical disk 172 may be free to be loaded into and unloaded from the magneto-optical disk unit, that is, detachable with respect to the magneto-optical disk unit. For the sake of convenience, FIG. 3 only shows portions of the firmware and the hardware of the DSP 116 directly related to the tracking control of the present invention.

A magneto-optical disk driving system, a read/write signal processing system and the like are not directly related to the subject matter of the present invention, and the illustration of such systems is omitted in FIG. 3. In addition, the basic structure of the magneto-optical disk unit is not limited to the basic structure shown in FIG. 3, and various known basic structures may be employed instead as long as a processor such as the DSP 116 is capable of carrying out the operations which will be described hereunder. In FIG. 3, those parts which are the same as those corresponding parts in FIGS. 1 and 2 are designated by the same reference numerals, and a description thereof will be omitted.

In FIG. 3, a light beam is irradiated on the magneto-optical disk 172 by the optical head 3, and of the light beam which is reflected from the magneto-optical disk 172, a light component which is used for tracking control is detected by a TES detector of the photodetector section 4. Hence, the TES is supplied to the binarization circuit 7 and to the ADC 21 within the DSP 116 via the amplifier/filter/offset adding circuit 5. The optical head 3 and the photodetector section 4 correspond to the laser diode unit 130, the ID/MO detector 132, the head amplifier 134, the FES detector 145 and the TES detector 147 shown in FIG. 1. The amplifier/filter/offset adding circuit 5 is provided with an amplifying function, a filtering function, and an offset adding function. The ADC 21 supplies the digitally converted TES to the amplifier 22 and the TES amplitude and offset detection circuit 31. The TES amplitude and offset detection circuit 31 detects a positive peak value and a negative peak value of the TES, and supplies the detected peak values to the MPU 112.

Based on the positive and negative peak values supplied from the TES amplitude and offset detection circuit 31, the MPU 112 supplies an offset amount to the amplifier/filter/offset adding circuit 5 via the DAC 32 within the DSP 116 so that the tracking control is carried out in a vicinity of zero TES, so as to correct the offset of the TES, and also controls the gain of the amplifier 22 within the DSP 116 so that the amplitude of the TES becomes a prescribed amplitude. Hence, a normalized TES in which an amount of deviation with respect to the level of the TES is normalized, is obtained from the amplifier 22 and supplied to the offset adding circuit 23.

The normalized TES from the amplifier 22 is added with an offset amount in the offset adding circuit 23 as will be described later, before being supplied to the tracking controller 24 which includes a function of a phase compensation filter. The tracking controller 24 carries out a phase compensation and the like with respect to the normalized TES, and outputs a positional error with respect to a tracking target. This positional error is supplied to the track (lens) actuator 164 via the switching circuit 25, the DAC 26 and the driver 162 so as to control the actuator 164 by a known method, in order to control the optical head 3, that is, to carry out the tracking control with respect to the light beam.

In addition, the TES from the amplifier/filter/offset adding circuit 5 is binarized by the binarization circuit 7 before being supplied to the counter 27 within the DSP 116. The velocity detector 28 detects a seek velocity based on an output of the counter 27, and the seek controller 29 supplies a seek velocity control signal to the switching circuit 25 based on the seek velocity detected by the velocity detector 28. The switching circuit 25 is switched and controlled based on a signal from the MPU 112, to output the signal from the seek controller 29 during a seek velocity control and to output a signal from the tracking controller 24 during a tracking ON state. The switching circuit 25 blocks both the signals from the seek controller 29 and the tracking controller 24 during a tracking OFF state.

On the other hand, of the light beam reflected from the magneto-optical disk 172, a light component used for the focus control is detected by a FES detector of the photodetector section 4. A focus error signal (FES) from the FES detector of the photodetector section 4 is supplied to the ADC 41 within the DSP 116 via the amplifier/filter/offset adding circuit 6. The amplifier/filter/offset adding circuit 6 is provided with an amplifying function, a filtering function, and an offset adding function, similarly to the amplifier/filter/offset adding circuit 5. The ADC 41 supplies the digitally converted FES to the focus controller 43 via the amplifier 42.

The focus actuator displacement detector 44 detects a displacement of the focus actuator 160 which is carrying out a focus control based on an output of the focus controller 43, that is, detects a surface fluctuation amount of the magneto-optical disk 172. The detected surface fluctuation amount is supplied from the focus actuator displacement detector 44 to the sensitivity correction circuit 45. The sensitivity correction circuit 45 supplies to the offset adding circuit 23 a sensitivity correction value which is dependent on the surface fluctuation amount. In addition, the output of the focus controller 43 is supplied to the focus actuator 160 via the switching circuit 46, the DAC 47 and the driver 158 so as to control the focus actuator 160 by a known method, in order to control the optical head 3, that is, to carry out the focus control with respect to the light beam. The switching circuit 46 is switched and controlled based on a signal from the MPU 112, so as not to supply the output of the focus controller 43 to the DAC 47 when carrying out no focus control.

Next, a general description will be given of the tracking control of this embodiment using an optimum offset of a tracking target position. A process of obtaining an optimum offset of the tracking target position which will be described later identifies the medium type of the loaded optical recording medium. The process is carried out in synchronism with a test write process if the loaded optical recording medium is a high-density optical recording medium, that is, a 3.5-inch magneto-optical disk having a storage capacity of 2.3 GB or greater. On the other hand, the process is not carried out if the loaded optical recording medium is a low-density optical recording medium, that is, a magneto-optical disk having a storage capacity less than 2.3 GB, and the optimum offset of the tracking target position is not obtained in this case.

First, the offset of the tracking target position is detected as follows. In other words, the data is written on one write test track of a plurality of test tracks, at an optimum recording (write) power which is obtained by the test write process proposed in a Japanese Laid-Open Patent Application No.9-293259, a Japanese Laid-Open Patent Application No.11-73669 or a Japanese Laid-Open Patent Application No.11-16251, for example. The test tracks on the magneto-optical disk 172 are provided in one or more regions for use in adjusting the power of the light beam by the test write process and the test read process, and no user data will be written on these test tracks.

Next, with respect to two adjacent tracks on respective sides of a certain track on which the data is written at an optimum recording power, the data is written under a write condition which will easily affect the certain track. More particularly, the data is written on the two adjacent tracks at a recording power, which is obtained by multiplying to the optimum recording power a coefficient which will increase the recording power with respect to the optimum recording power by a prescribed ratio, and is larger than the optimum recording power. In this case, it is also possible to record the data on all of the three tracks, namely, the certain track and the two adjacent tracks, at the large recording power for the purposes of reducing the processing time. In addition, in the case of the magneto-optical disk 172 which employs the land-groove recording system, it is necessary to write the data on a minimum of four tracks, so that a track written with the data exists on both sides of each track in both cases where the land is reproduced and the groove is reproduced.

When increasing the recording power, the amount of increase is set on the order of approximately the difference between the optimum recording powers of the write test track and the user track or, on the order of approximately the amount by which the recording power is increased or decreased during the write retry process. By the above described process, it is possible to confirm an amount of signal leak from the adjacent tracks at the user track on which the user data is actually written.

Next, the data is reproduced while gradually increasing the offset data which is supplied to the offset adding circuit 23, so that the tracking is made towards the positive side of the TES, that is, in the outer peripheral direction of the magneto-optical disk 172, for example. The read data which is obtained by reading the write data written on the magneto-optical disk 172 is subjected to a bit or byte comparison using the ECC processor 114-2 of the ODC 114, so as to measure the number of bit or byte errors or, the bit or byte error rate or, the number of ECC-corrected bytes from the result of the bit or byte comparison. When the measurement is made in a state where the reproducing (read) power is increased by the prescribed amount or the prescribed ratio so as to more easily receive the effects of the adjacent tracks, a deviating width (changing amount) of the offset of the tracking target position can be made small.

In the following description, it is assumed for the sake of convenience that the number of bit errors is measured.

Figure 4:
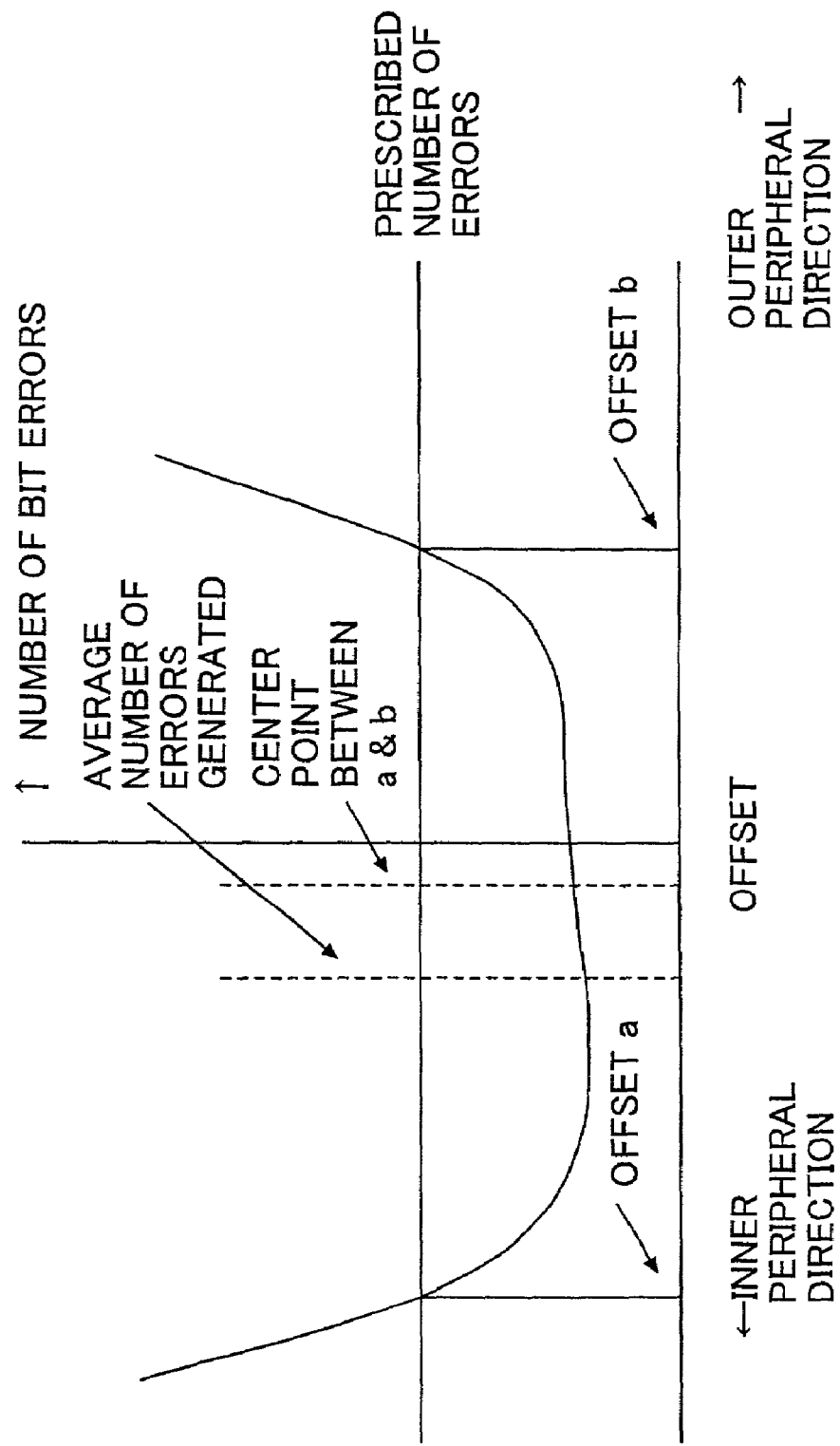
FIG. 4 is a diagram showing a relationship of an offset of a tracking target position and a number of bit errors.

FIG. 4 is a diagram showing a relationship of the offset of the tracking target position and the number of bit errors obtained by the above described measurement. In FIG. 4, the ordinate indicates the number of bit errors in arbitrary units, and the abscissa indicates the position on the magneto-optical disk 172. On the abscissa, a direction to the left indicates the inner peripheral direction of the magneto-optical disk 172, and a direction to the right indicates the outer peripheral direction of the magneto-optical disk 172. Moreover, in FIG. 4, a point where the number of bit errors becomes greater than or equal to a prescribed value is indicated as an offset a. Furthermore, the data is reproduced while gradually increasing the offset data which is supplied to the offset adding circuit 23, so that the tracking is made towards the negative side of the TES, that is, in the inner peripheral direction of the magneto-optical disk 172, for example, and a point where the number of bit errors becomes greater than or equal to the prescribed value is indicated as an offset b. A center point between the offsets a and b is regarded as a minimum point of the number of bit errors, and this minimum point is used as the optimum offset of the tracking target position.

In FIG. 4, the measured result shows an approximate U-shape. However, it is of course possible to detect the minimum point of the number of bit errors in the following manner for a case such as when the measured result shows an approximate V-shape. In other words, the measured results which are respectively obtained by adding the offset in the positive and negative directions and measuring the number of bit errors are stored in the memory 118, and a point where the offset is largest in the negative direction is regarded as a reference of offset zero (0). The number of bit errors from the offset zero to the maximum value of the offset in the positive direction, that is, the offset n, may be accumulated to obtain an average Ave of the number of bit errors, so as to obtain the offset which minimizes the number of bit errors from a formula "(offset adding value at the time of the offset zero)+{(offset changing width at the time of measurement)×(Ave)}=(offset which minimizes the number of bit errors)".

Of course, the optimum offset of the tracking target position may be obtained by techniques other than those described above. The offset of the tracking target position which is considered to optimize the data reproducing characteristic according to such other techniques may be regarded as the optimum offset of the tracking target position.

In a case where the number of bit errors is larger than the prescribed value even when the offset is changed or, in a case where the number of bit errors is smaller than the prescribed value but the offset width which satisfies the prescribed value is narrow, the measuring process is carried out again by reducing the recording power or the reproducing power. A lower limit of the reproducing power is set to the optimum reproducing power, and a remeasuring process is carried out to measure the number of bit errors in the offset adding state. A lower limit of the recording power is set to a recording power which is larger than a minimum writable power which is obtained by the test write process, by an amount corresponding to the recording power increasing amount or the recording power increasing ratio described above, and a remeasuring process is carried out to measure the number of bit errors from the rewriting.

On the other hand, in a case where the number of bit errors is smaller than the prescribed value but the offset width which satisfies the prescribed value is too wide, the measuring process is carried out again by increasing the recording power or the reproducing power. In a case where the number of bit errors is smaller than the prescribed value but the offset width which satisfies the prescribed value is too wide even when the recording power and the reproducing power are increased to a certain extent, the optimum offset of the tracking target position is set to zero (0).

The process described above is executed by managing for each zone or each zone group of the magneto-optical disk 172. In addition, since the process described above is dependent on the temperature change of the magneto-optical disk 172, an execution time and/or an execution temperature of with respect to the zone is stored in the memory 118, and the measuring process is carried out again if a difference greater than or equal to a prescribed value exists between a present execution time and/or a present execution temperature and the execution time and/or the execution temperature of the process executed before. Immediately after the magneto-optical disk 172 is loaded into the magneto-optical disk unit, the temperature change of the magneto-optical disk 172 with respect to time is relatively sharp. For this reason, immediately after loading the magneto-optical disk 172, the execution time interval of the process described above is set short, and the execution time interval is set longer as time elapses from the time of the loading.

The optimum offset of the tracking target position at the time of the reproduction is obtained by the process described above. However, the measured result may also be used at the time of the recording. At the time of the recording, it is possible to reduce the optimum offset of the tracking target position at the time of the reproduction which is obtained by the measuring process described above, by setting the offset of the tracking target position to a polarity opposite to that of the optimum offset of the tracking target position at the time of the reproduction. When correcting the offset of the tracking target position at the time of the recording (writing), the offset is set smaller than the optimum offset of the tracking target position at the time of the reproduction, because it is known from experience that the effects of the offset is larger at the time of the reproduction and it is less dangerous to write in a vicinity of the track center.

In addition, when the tracking target position is offset at the time of the recording, the optimum offset of the tracking target position at the time of the reproduction should become smaller than the optimum offset of the tracking target position added in the offset adding circuit 23, and thus, the optimum offset of the tracking target position needs to be corrected, that is, reduced.

The optimum offset of the tracking target position was described above with respect to units of one revolution of the magneto-optical disk 172. In other words, in the measurement in units of one revolution of the magneto-optical disk 172, the data is written on a number of tracks equal to an integer multiple (integer is one in the above described case) of one revolution of the magneto-optical disk 172. A number of data reproduction errors equal to an integer multiple of one revolution of the magneto-optical disk 172 is measured by varying the offset in the positive or negative direction in steps, and the optimum offset of the tracking target position is obtained.

Next, a description will be given of a case where the measurement is made in units corresponding to the rotary angle within one revolution of the magneto-optical disk 172. In this case, the data reproduction error with respect to the offset is measured in units of sectors which divide the rotary angle within one revolution of the magneto-optical disk 172 or in units of sector groups. The actual write process may be similar to the case of the measurement in units of one revolution of the magneto-optical disk 172. In other words, the managing target simply needs to be in units of sector or in units of sector groups. In this case, the data takes the form of discontinuous steps, but when this process is used at the time of the reproduction, the discontinuous data can be corrected into continuous data so that the offset is smoothly added.

Figure 5:
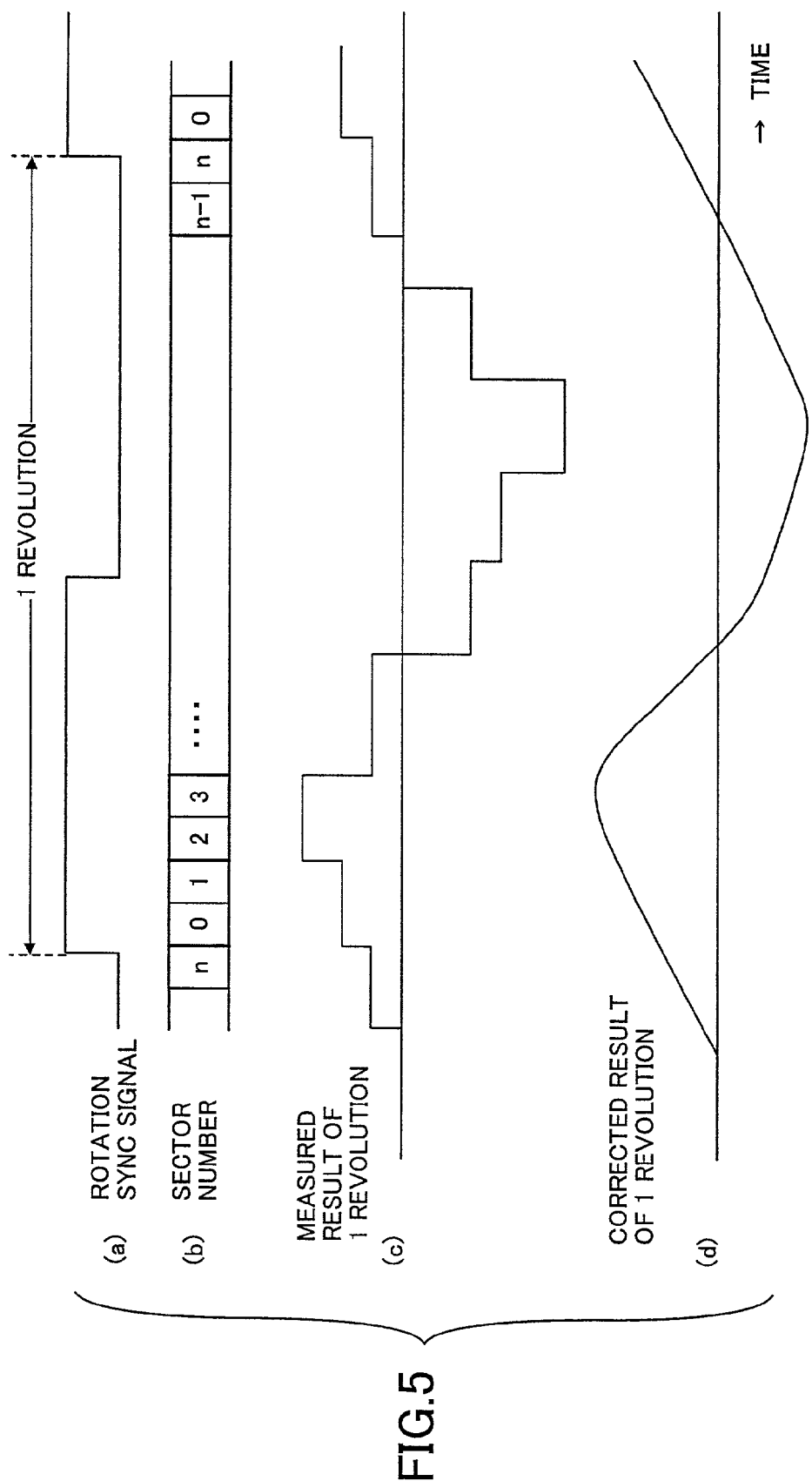
FIGS. 5(a) through 5(d) are diagrams for explaining a case where a measurement is made in units corresponding to a rotary angle within one revolution of a magneto-optical disk.

FIGS. 5(*a*) through 5(*d*) are diagrams for explaining a case where the measurement is made in units corresponding to the rotary angle within one revolution of the magneto-optical disk 172. FIG. 5(*a*) shows a rotation synchronizing signal which is synchronized to the rotation of the magneto-optical disk 172, FIG. 5(*b*) shows a sector number, FIG. 5(*c*) shows the measured result of data within one revolution of the magneto-optical disk 172, and FIG. 5(*d*) shows the corrected data within one revolution of the magneto-optical disk 172.

Figure 6A:
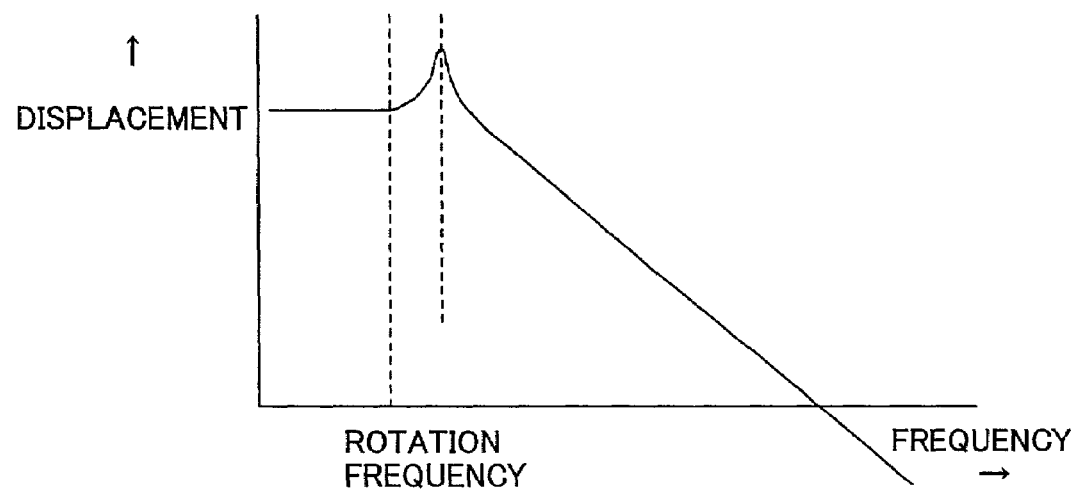
FIGS. 6A and 6B are diagrams showing characteristics of a focus actuator.
Figure 6B:
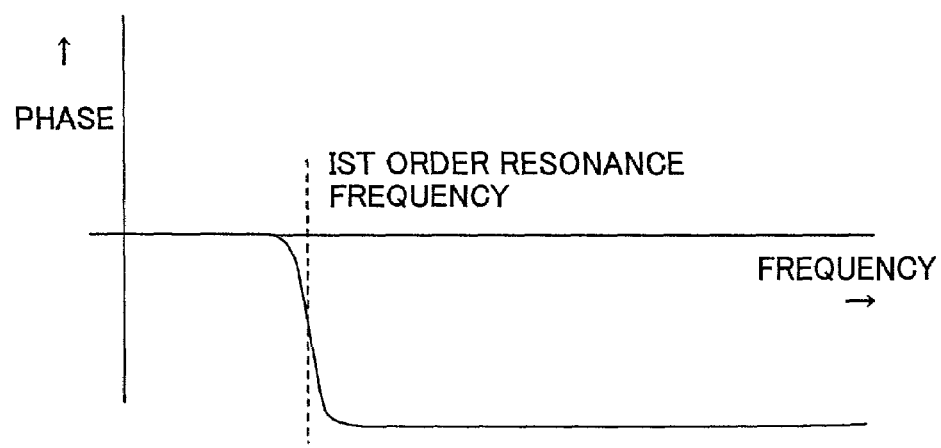

As another method of obtaining the optimum offset of the tracking target position, it is possible to utilize characteristics which indicate that the amount of surface fluctuation and the amount of tilt within one revolution of the magneto-optical disk 172 have a proportional relationship. A description will be given of the operation for a case where the focus actuator 160 has the characteristics shown in FIGS. 6A and 6B, by referring to FIGS. 7(*a*) through 7(*d*). FIGS. 6A and 6B are diagrams showing the characteristics of the focus actuator 160, and FIGS. 7(*a*) through 7(*d*) are diagrams for explaining the operation for the case where the focus actuator 160 has the characteristics shown in FIGS. 6A and 6B.

FIG. 6A shows a relationship of the displacement of the focus actuator 160 and an actuator driving current frequency, that is, an actuator driving transfer function (spring support type), and both the ordinate and the abscissa are in arbitrary units. In addition, FIG. 6B shows a relationship of a phase and a resonance frequency of the focus actuator 160, and both the ordinate and the abscissa are in arbitrary units.

The amount of surface fluctuation of the magneto-optical disk 172 can be found by detecting the displacement of the focus actuator 160 during the focus control, that is, the amount of focus control. The displacement of the focus actuator 160 can be obtained from a driving current instruction value with respect to the focus actuator 160 during the focus servo by calculation using the actuator driving transfer function. In the case of the spring support type focus actuator 160, the driving current instruction value can be calculated using the actuator driving transfer function. When the displacement of the focus actuator 160 is denoted by Xf, the displacement Xf can be calculated from the following formula, where Gf denotes the actuator driving transfer function of the focus actuator 160, If denotes the driving current of the focus actuator 160, Cf denotes the coil coefficient of the focus actuator 160, mf denotes the mass of the focus actuator 160, Df denotes the damper coefficient of the focus actuator 160, Kf denotes the spring constant of the focus actuator 160, and s denotes an operator which is generally used when solving the differential equation by Laplace transform. The operator s is $s=j\omega=j2\pi f$, where $\omega$ denotes the angular frequency (rad/s) and f denotes the frequency (Hz).

$$Xf = Gf \times If = Cf/(mf \times S^2 + Df \times s + Kf)$$

The displacement of the focus actuator 160 may be calculated constantly during one revolution of the magneto-optical disk 172, and the correction may be made using the output which is multiplied by a coefficient as the optimum offset of the tracking target position.

Figure 7:
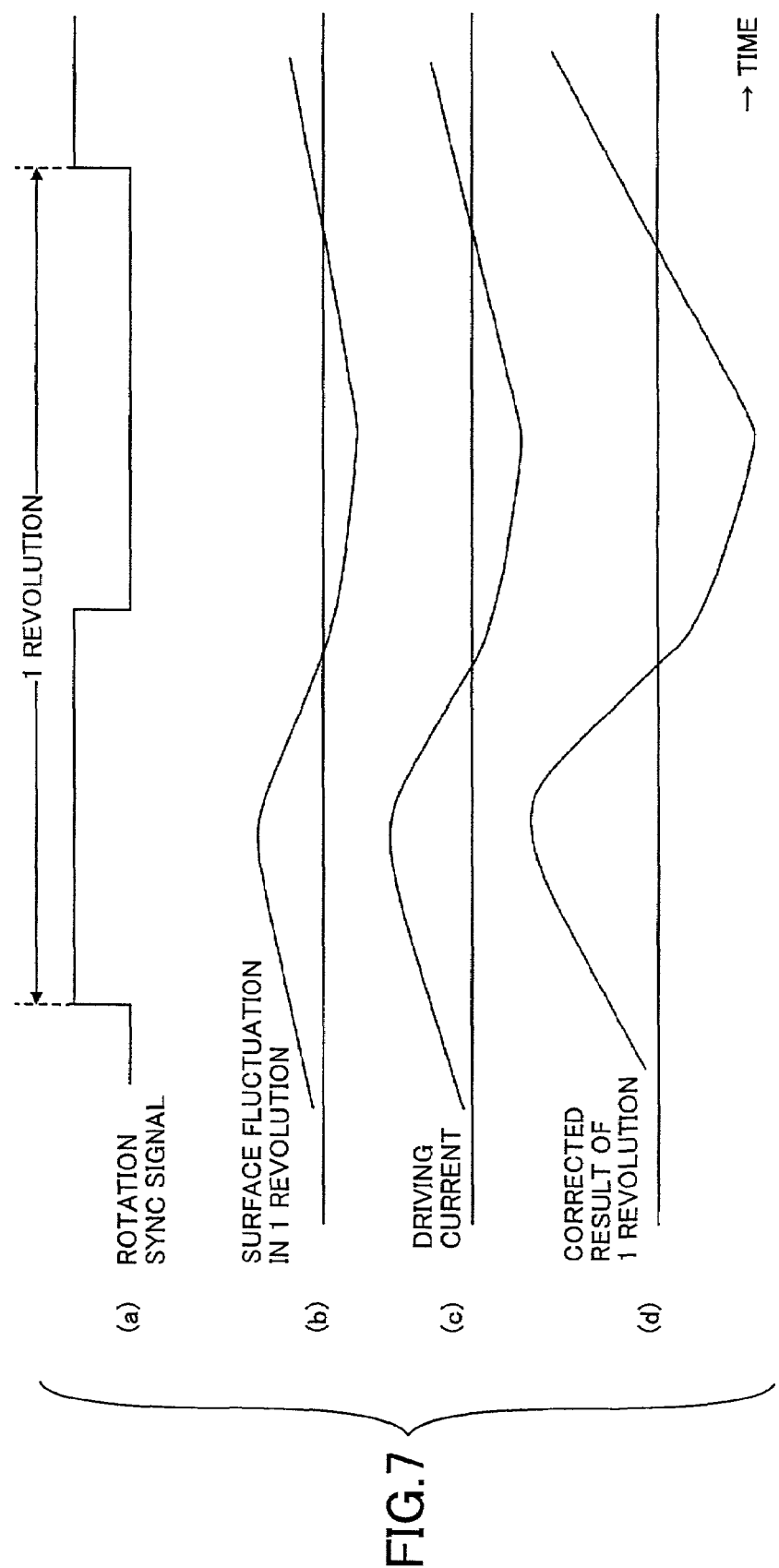
FIGS. 7(a) through 7(d) are diagrams for explaining an operation for a case where the focus actuator has the characteristics shown in FIGS. 6A and 6B.

FIG. 7(*a*) shows the rotation synchronizing signal which is synchronized to the rotation of the magneto-optical disk 172, FIG. 7(*b*) shows the amount of surface fluctuation within one revolution of the magneto-optical disk 172, FIG. 7(*c*) shows the driving current of the focus actuator 160, and FIG. 7(*d*) shows the corrected data within one revolution of the magneto-optical disk 172.

In this state, an A.C. component of the displacement of the focus actuator 160 may be detected, and the correction may be made by adding an optimum offset transition of the tracking target position corresponding only to the A.C. component to the optimum offset of the average tracking target position for one revolution which is obtained by the above described measurement in units of one revolution of the magneto-optical disk 172. In addition, the correction may be made solely by the optimum offset of the tracking target position corresponding to the displacement itself of the focus actuator 160, without making the measurement in units of one revolution of the magneto-optical disk 172. In this case, it is necessary to correct the offset in a state where a distance between a neutral point of the focus actuator 160 and the magneto-optical disk 172 is known. When the offset is corrected and stored in the memory 118 when starting the magneto-optical disk unit at the factory, for example, the amount of relative change with respect to the stored value is corrected.

As may be seen from the description given heretofore, there is a close relationship between the offset of the tracking target position and the data reproduction error. During the retry process which is carried out when the read error is generated at the time of the reproduction, there is a possibility that the sector in which the read error is generated can no longer be read if the offset of the tracking target position is changed in the positive or negative direction. Hence, it is desirable to set a mode for changing the offset of the tracking target position in the positive or negative direction during the retry process which is carried out when the read error is generated at the time of the reproduction. It is effective to carry out a learning process which counts the number of successes for the case where the offset is changed in the positive direction and the case where the offset is changed in the negative direction, statistically processes the results of the count at a prescribed timing, and restores the optimum offset of the tracking target position so as to improve the success rate. The concept of the learning process may be found in a Japanese Laid-Open Patent Application No.2000-182292, for example, which proposes a recording and/or reproducing power learning method, and the recording and/ or reproducing power parameter used by this proposed method may be replaced by the offset of the tracking target position.

In a verify process after the write, it is desirable to reduce the optimum offset of the tracking target position by a prescribed amount before adding. In addition, in a retry process, it is desirable not to change the offset of the tracking target position or, to make the amount of change smaller than that at the time of the normal reproduction. Furthermore, it is desirable that the change of the offset of the tracking target position is not made the subject of a learning process.

Figure 8:
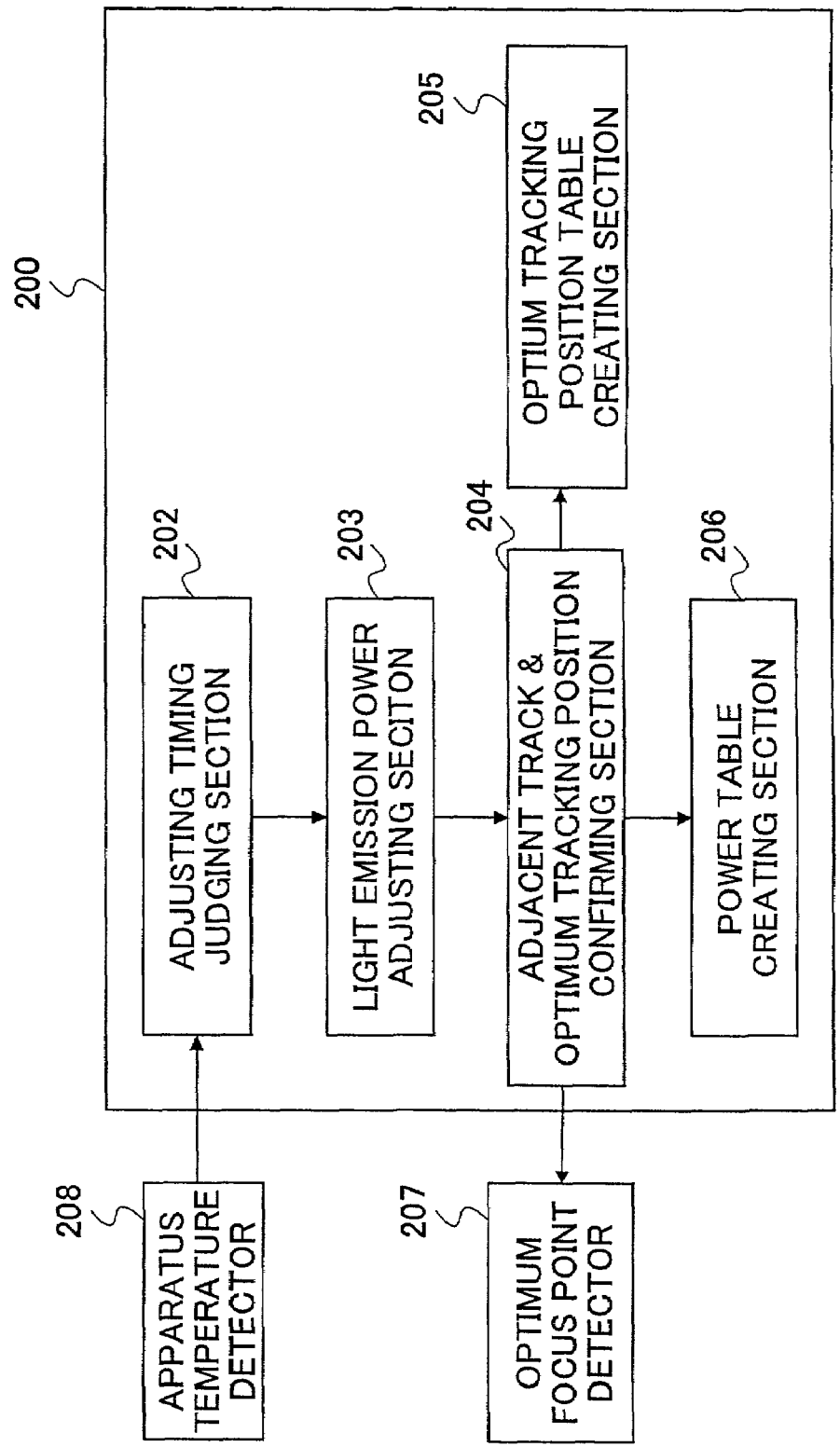
FIG. 8 is a functional block diagram showing an important part shown in FIG. 3.

The process described above may be realized by the means shown in FIG. 8. FIG. 8 is a functional block diagram showing an important part shown in FIG. 3.

In FIG. 8, a light emission adjusting section 200 corresponds to the MPU 112 shown in FIG. 1, an optimum focus point detector 207 corresponds to the DSP 116 shown in FIG. 3, and an apparatus temperature detector 208 corresponds to the temperature sensor 136 shown in FIG. 3. The light emission adjusting section 200 is formed by a program or firmware having processing functions of an adjusting timing judging section 202, a light emission power adjusting section 203, an adjacent track and optimum tracking position confirming section 204, an optimum tracking position table creating section 205, and a power table creating section 206.

The adjusting timing judging section 202 judges a recording power adjusting timing of the light emission power adjusting section 203 based on a temperature detection signal from the apparatus temperature detector 208 which detects the temperature within the magneto-optical disk unit, and starts a recording power adjusting process. The adjusting timing judging section 202 does not start the recording power adjusting process immediately after the magneto-optical disk 172 is loaded into the magneto-optical disk unit. When an initializing process of the magneto-optical disk unit ends and a first write command is issued from a host unit (not shown), the adjusting timing judging section 202 starts the light emission power adjusting section 203 in response to this first write command to thereby carry out a first light emission power adjusting process which involves a test write process. If the type of the loaded magneto-optical disk 172 is the high-density type having a storage capacity of 2.3 GB or greater, the adjacent track and optimum tracking position confirming section 204 is next started to thereby confirm whether or not a data destruction exists in the adjacent track by a test write process at the determined recording power and also confirm the optimum tracking position, that is, the optimum offset of the tracking target position.

Once the recording power adjusting process by the adjacent track and optimum tracking position confirming section and the light emission power adjusting section 203 ends, an effective time of a recording power adjustment result is calculated thereafter. When an elapsed time from the end of the adjustment reaches the effective time, the processes of the light emission power adjusting section 203 and the adjacent track and optimum tracking position confirming section 204 for the next recording power adjustment are successively started. For example, the effective time is increased to every ten seconds, every two minutes, every ten minutes, etc. depending on the elapsed time- In addition, if a temperature change T within the magneto-optical disk unit obtained from the apparatus temperature detector 208 exceeds ±3° C. during the time until the elapsed time reaches the effective time, the light emission power adjusting section 203 and the adjacent track and optimum tracking position confirming section 204 are started to forcibly carry out the recording power adjusting process.

The light emission power adjusting section 203 specifies an arbitrary test write region of a user unused region of the loaded magneto-optical disk 172, and writes a predetermined test pattern by gradually reducing the recording power in steps. The written test pattern is thereafter read and compared with the original test pattern, to repeat a process of counting a number of mismatch of the compared test patterns. In this test write process, the recording power at the time when the counted number of mismatches of the compared test patterns exceeds a predetermined maximum value is detected as a limit recording power.

When the limit recording power is detected while reducing the recording power in steps, a value obtained by adding a predetermined offset to this limit recording power is determined to be an optimum recording power. The setting of the recording power in the light emission power adjusting section 203 is made by use of a default ratio having as a reference a recording power default value at this point in time. Accordingly, the limit recording power is also detected as a default ratio indicating the limit recording power, and a value obtained by adding a predetermined offset to this limit recording power is determined to be a default value of the optimum recording power.

After the test write process is carried out in the test write region of the magneto-optical disk 172 by driving the laser diode at the recording power and erase power determined by the light emission power adjusting section 203, the adjacent track and optimum tracking position confirming section 204 confirms whether or not the data reproduction is possible by reproducing the adjacent track, and confirms whether or not a data destruction or deterioration exists. If no data destruction or deterioration exists, the recording power and erase power used for the test write process are set as the optimum recording power. In addition, the adjacent track and optimum tracking position confirming section 204 obtains the optimum tracking position based on a result of the optimum tracking position detection process. The optimum tracking position table creating section 205 creates an optimum tracking position table based on the optimum tracking position obtained by the adjacent track and optimum tracking position confirming section 204. Moreover, the power table creating section 206 creates a power table based on the recording power determined by the light emission power adjusting section 203 and the optimum recording power set by the adjacent track and optimum tracking position confirming section 204.

The processing procedure of the adjacent track and optimum tracking position confirming section 204 can be formed by the following steps ST1 through ST3. When the adjacent track confirming process ends normally, the test write region is erased.

The step ST1 test-writes a first test pattern on all tracks of the test write region. The step ST2 test-writes a second test pattern a prescribed number of times at a specific sector position of a specific track in the test write region. The step ST3 reproduces an adjacent sector which is adjacent to the sector test-written with the second test pattern, and confirms whether or not a data destruction exists, and also obtains the optimum tracking position.

Therefore, according to this embodiment, the adjacent track and optimum tracking position confirming section 204 within the light emission adjusting section 200 carries out the optimum tracking position confirming process in addition to the adjacent track confirming process, and the optimum tracking position table creating section 205 creates the optimum tracking position table. Otherwise, the operation of this embodiment is basically the same as the operation of the functional blocks shown in FIG. 1(A) of the Japanese Laid-Open Patent Application No.11-16251 described above.

Figure 9:
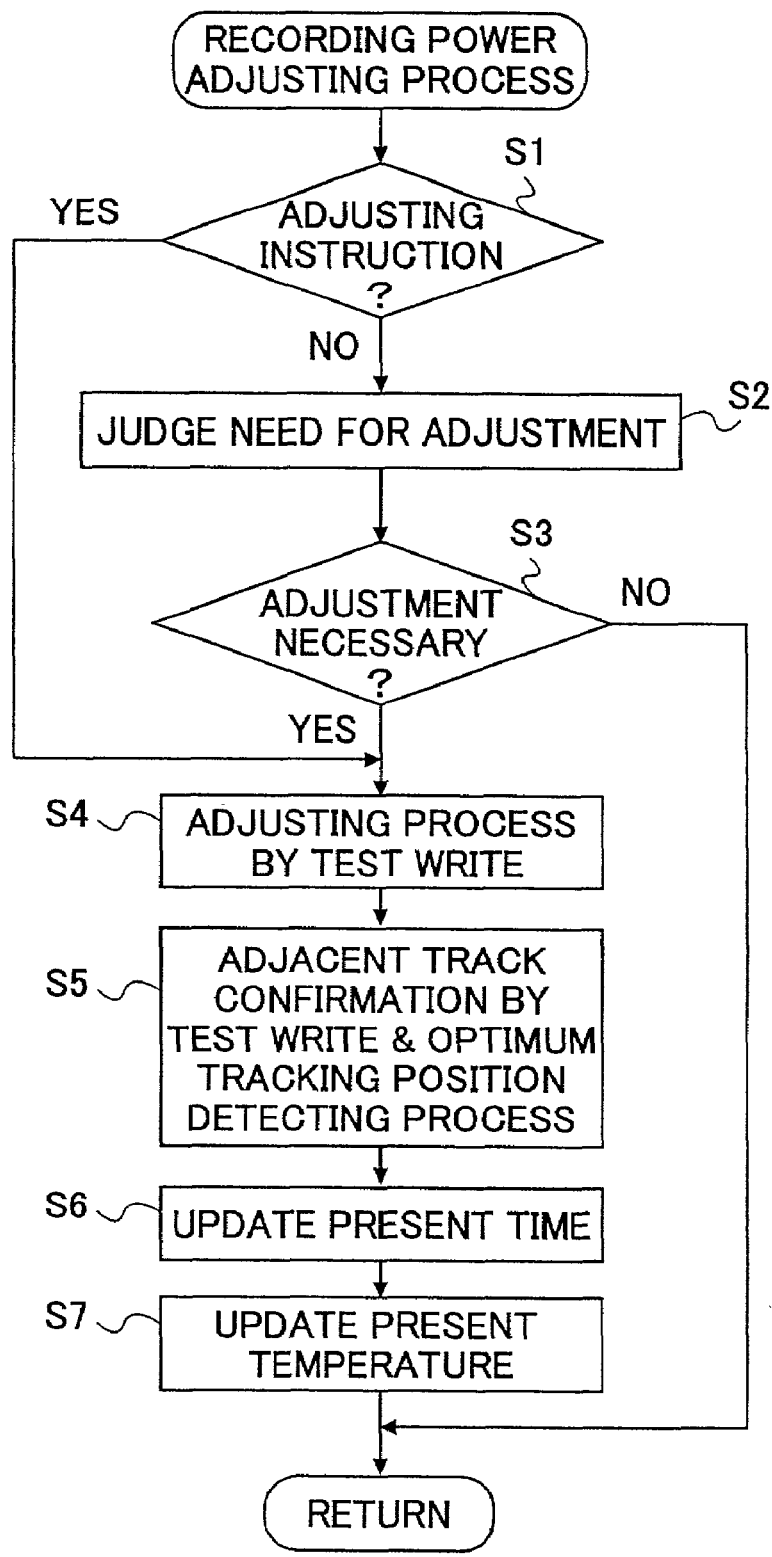
FIG. 9 is a flow chart for explaining a recording power adjusting process including confirmation of an adjacent track.
Figure 11:
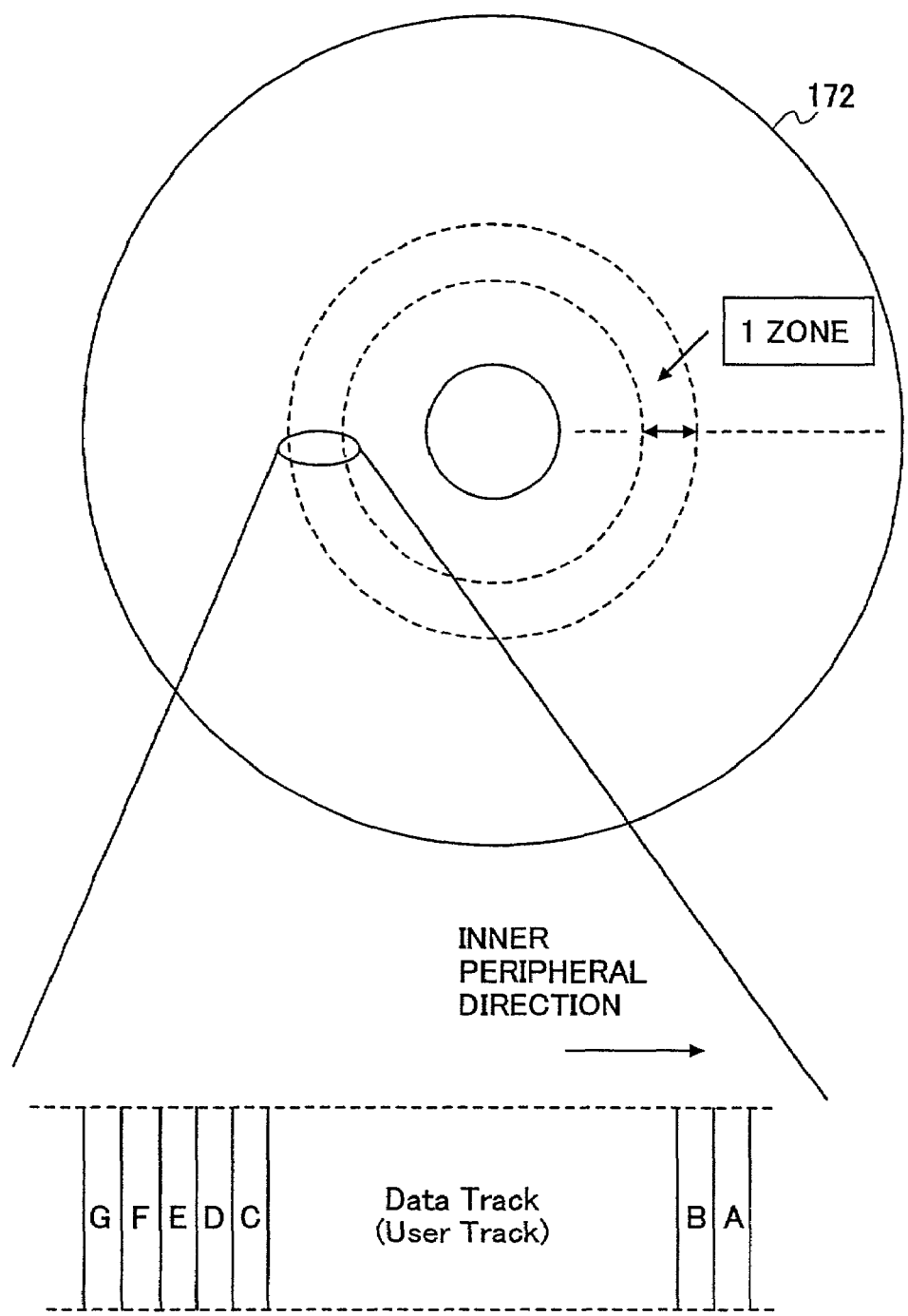
FIG. 11 is a diagram for explaining a recording format on the magneto-optical disk.
Figure 12:
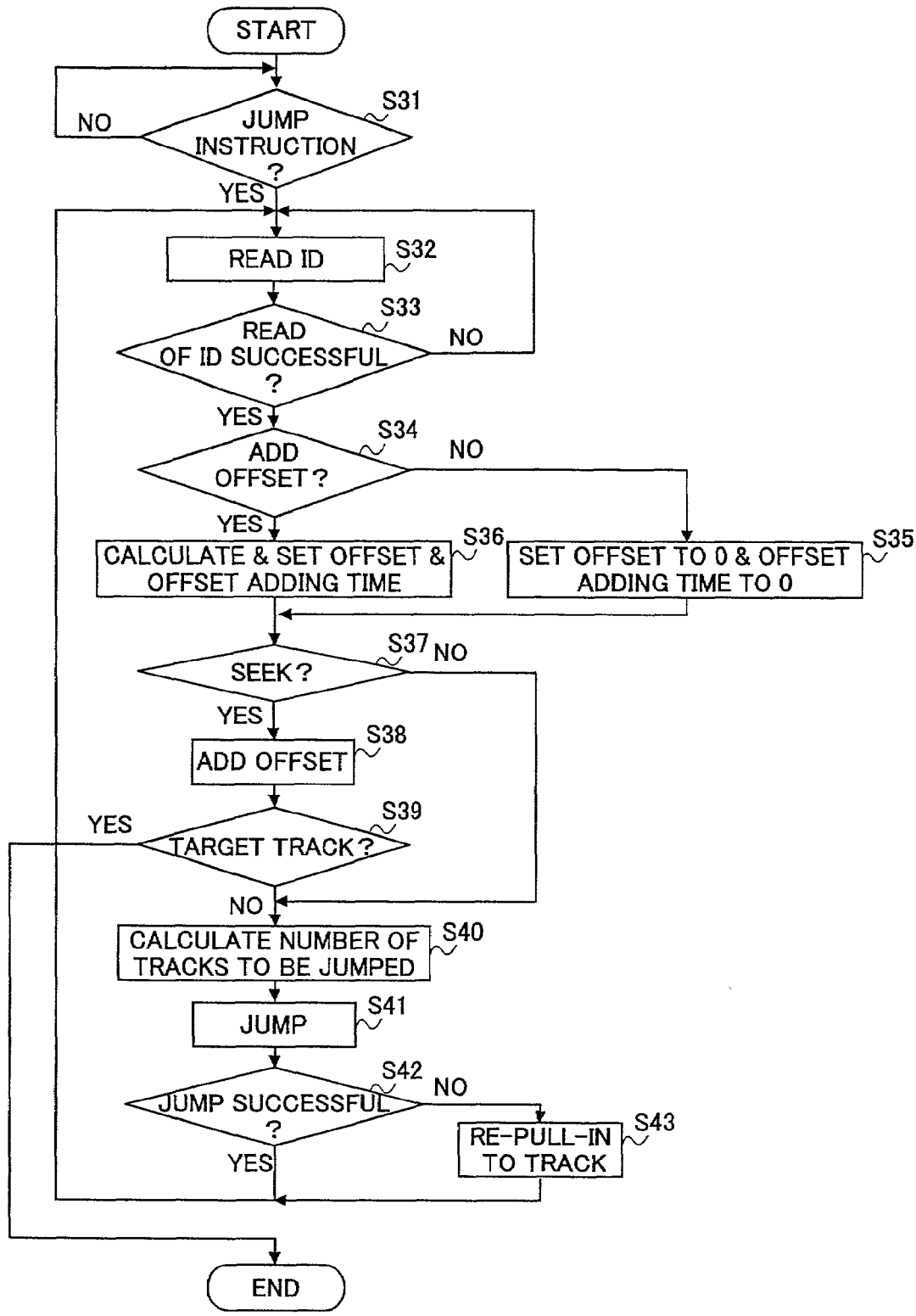
FIG. 12 is a flow chart for explaining a process of adding an optimum offset of a tracking target position.
Figure 13:
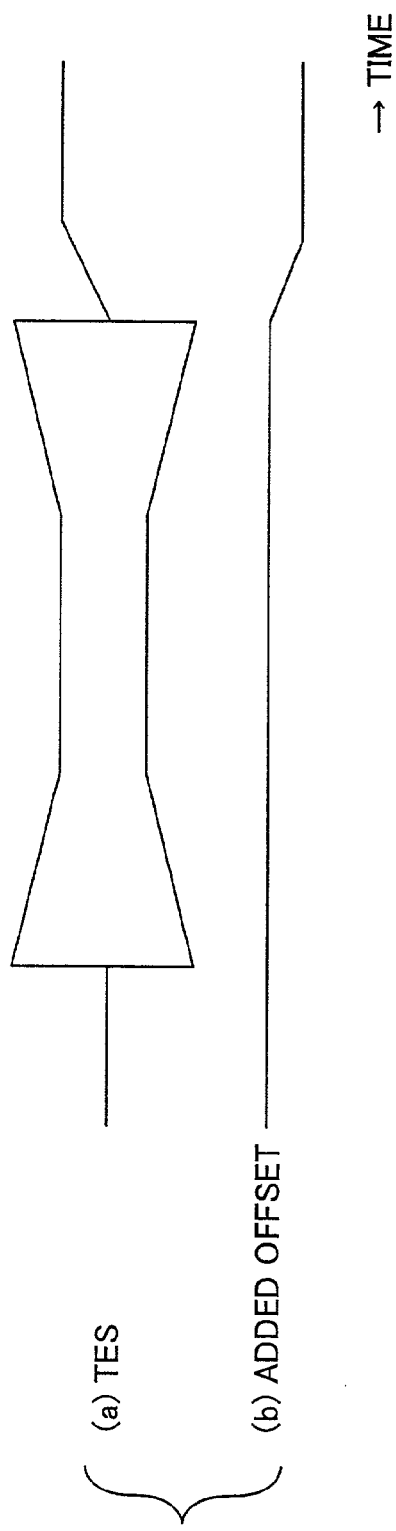
FIGS. 13(a) and 13(b) are diagrams for explaining the process of adding the optimum offset.

In other words, a disk starting process prior to the light emission power adjustment, a recording power adjusting process including confirmation of the adjacent track, a judgement on the necessity to make the recording power adjustment, a recording power adjusting process using the test write, and the adjacent track confirming process become similar to those shown in FIGS. 11, 12, 13, 14 and 20 of the Japanese Laid-Open Patent Application No.11-16251 described above. However, in this embodiment, a step S5' within the recording power adjusting process which includes confirmation of the adjacent track as shown in FIG. 12 of the Japanese Laid-Open Patent Application No.11-16251, must carry out the optimum tracking position confirming process in addition to the adjacent track confirming process using the test write, as shown in FIG. 9. FIG. 9 is a flow chart for explaining the recording power adjusting process including the confirmation of the adjacent track. In FIG. 9, those steps which are the same as those corresponding steps in FIG. 12 of the Japanese Laid-Open Patent Application No.11-16251 are designated by the same reference numerals, and a description thereof will be omitted.

Figure 10:
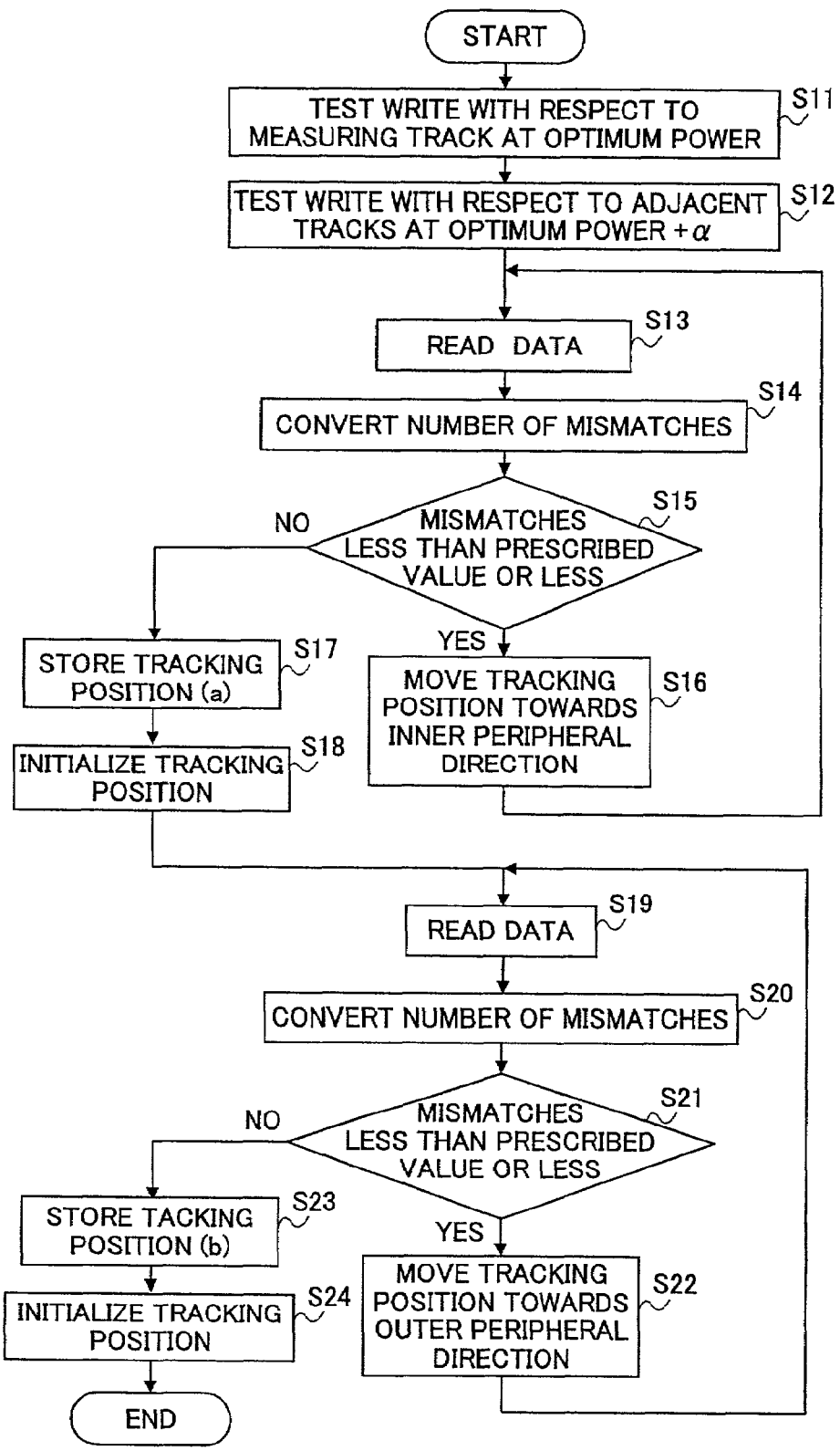
FIG. 10 is a flow chart for explaining a process of obtaining a center point of increasing points of the number of bit errors.

The recording power which is obtained by the adjacent track confirming process shown in FIG. 20 of Japanese Laid-Open Patent Application No.11-16251 is set as the optimum recording power, and a process shown in FIG. 10 is carried out thereafter. FIG. 10 is a flow chart for explaining the process of obtaining a center point of increasing points of the number of bit errors. More particularly, FIG. 10 shows the process of obtaining the center point of the increasing points of the number of bit errors, that is, the center point of the offsets a and b shown in FIG. 4, from the measured result of the number of bit errors having the approximate U-shape, and regarding the center point as a minimum point of the number of bit errors.

In FIG. 10, a step S11 carries out a test write process with respect-to a measuring track at an optimum power, and a step S12 carries out a test write process with respect to adjacent tracks on both sides of the measuring track at a power which is obtained by adding an offset to the optimum power. A step S13 carries out a data read process, and reproduces the data (test data) from the measuring track and the two adjacent tracks. A step S14 converts a number of mismatches of the reproduced data into units of words, for example, and a step S15 decides whether or not the number of data mismatches is less than or equal to a prescribed value. If the decision result in the step S15 is YES, a step S16 moves the tracking position towards the inner peripheral direction of the magneto-optical disk 172, and the process returns to the step S13.

On the other hand, if the decision result in the step S15 is NO, a step S17 stores the tracking position (offset b), and a step S18 initializes the tracking position to a center value. Thereafter, a step S19 carries out a data read process, similarly to the step S13 described above, and a step S20 converts the number of data mismatches to units of words, for example, similarly to the step S14 described above. In addition, a step S21 decides whether or not the number of data mismatches is less than or equal to a prescribed value, similarly to the step S15 described above. If the decision result in the step S21 is YES, a step S22 moves the tracking position towards the outer peripheral direction of the magneto-optical disk 172, and the process returns to the step S19.

If the decision result in the step S21 is NO, a step S23 stores the tracking position (offset a), and a step S24 detects a center point of the stored tracking positions (offsets a and b). The process ends after the step S24. The detected center point is regarded as the minimum point of the number of bit errors, that ism, the optimum offset of the tracking target position.

FIG. 11 is a diagram for explaining a recording format on the magneto-optical disk 172. As shown on an enlarged scale in a lower part of FIG. 11, a buffer0 region A, a buffer1 region B, a spare region C, a data track region (user track region) DATA, a buffer2 region D, a test write region E, a buffer3 region F and a buffer4 region G are successively provided towards the outer peripheral direction in one zone on an inner peripheral portion of the magneto-optical disk 172. When obtaining the optimum offset of the tracking target position, the test write region E is used, similarly as when obtaining the optimum power.

Next, a description will be given of a process of adding the optimum offset of the tracking target position, by referring to FIGS. 12, 13(a) and 13(b). FIG. 12 is a flow chart for explaining the process of adding the optimum offset of the tracking target position, and FIGS. 13(a) and 13(b) are diagrams for explaining the process of adding the optimum offset.

The process shown in FIG. 12 is started when the MPU 112 receives from the host unit a seek command having a reproduction or recording as the object. A step S31 decides whether or not a jump instruction caused by the received seek command is issued. If the decision result in the step S31 is YES, a step S32 reads an identification (ID) portion of the magneto-optical disk 172. A step S33 decides whether or not the reading of the ID portion is successful, and the process returns to the step S32 if the decision result in the step S33 is NO. On the other hand, if the decision result in the step S33 is YES, a step S34 decides whether or not to add the offset of the tracking target position, based on the processing object of the seek command. If the decision result in the step S34 is NO, a step S35 sets the offset to zero (0) and sets the offset adding time to zero (0), and the process advances to a step S37.

On the other hand, if the decision result in the step S34 is YES, a step S36 reads the optimum offset of the tracking target position from the memory 118, calculates and sets the offset depending on the reproducing or recording process, calculates and sets the offset adding time, and the process advances to the step S37. The step S37 decides whether or not the seek is carried out. The process advances to a step S40 which will be described later if the decision result in the step S37 is NO. If the decision result in the step S37 is YES, a step S38 adds the set offset, and a step S39 decides whether or not the target track included in the seek command is reached.

If the decision result in the step S39 is NO, the step S40 calculates the number of tracks to be jumped in order to reach the target track, and a step S41 jumps the calculated number of tracks. A step S42 decides whether or not the jump is successful. If the decision result in the step S42 is NO, a step S43 carries out a re-pull-in to the track, and the process returns to the step S32. If the decision result in the step S42 is YES, the process returns to the step S32. In addition, the process ends if the decision result in the step S39 is YES.

Accordingly, when it is judged in the step S34 that the addition of the offset is unnecessary, the present track is confirmed and the distance to the target track is calculated. In this case, a rotation correction is made, and an optimum number of tracks to be jumped is set. When the jump is started and the jump ends, a confirmation is made to determine whether or not the target track is reached, and if not, a process is carried out to make the jump again, so that the target track is finally reached similarly as in the conventional case.

On the other hand, if it is judged in the step S34 that the addition of the offset is necessary, the present track is confirmed and the distance to the target track is calculated. The rotation correction is also made in this case, and the optimum number of tracks to be jumped is set. The correction process takes into account the time required for the offset adding process after the seek ends. Thereafter,-when the jump starts and ends, the offset is gradually added up to the target track. A confirmation is made to determine whether or not the target track is reached, and if not, a process is carried out to make the jump again, so that the target track is finally reached. In addition, when carrying out the correction corresponding to one revolution of the magneto-optical disk 172, the data corresponding to one revolution is transferred, the offset is added up to the average value of the offset corresponding to one revolution, and the data corresponding to one revolution is automatically output thereafter in synchronism with the rotation of the magneto-optical disk 172.

FIG. 13(a) shows the TES during the seek, and FIG. 13(b) shows the offset which is added by the process of adding the optimum offset of the tracking target position by the seek.

As described above, the target track confirming process and the offset adding process may be carried out in parallel.

Figure 14:
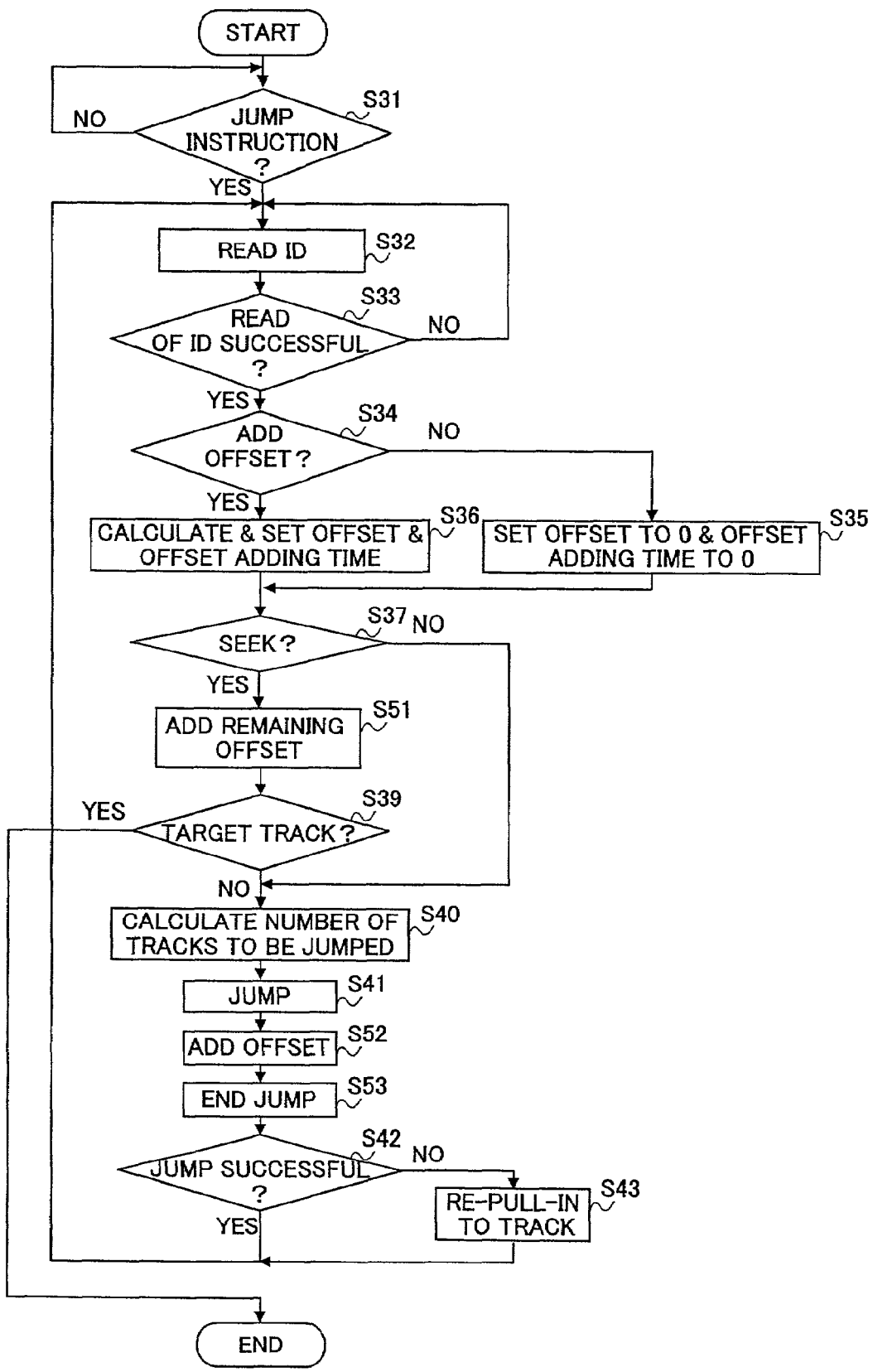
FIG. 14 is a flow chart for explaining the process of adding the optimum offset of the tracking target position in a second embodiment of the storage apparatus according to the present invention.
Figure 15:
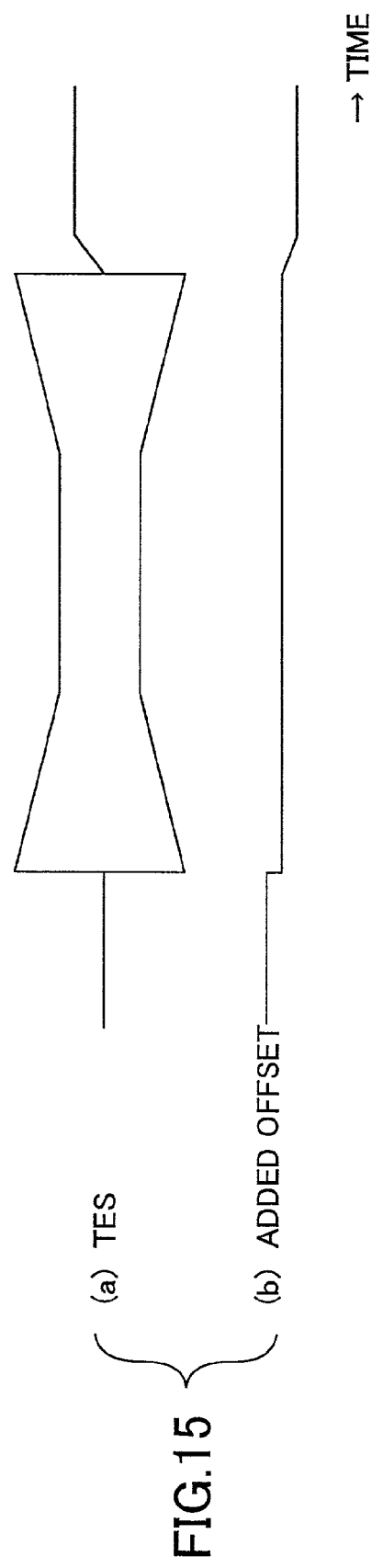
FIGS. 15(a) and 15(b) are diagrams for explaining the process of adding the optimum offset.

Next, a description will be given of the process of adding the optimum offset of the tracking target position at the time of the actual reproduction or recording, in a second embodiment of the storage apparatus according to the present invention, by referring to FIGS. 14, 15(a) and 15(b). The basic structure of this second embodiment of the storage apparatus is the same as the basic structure shown in FIG. 3. FIG. 14 is a flow chart for explaining the process of adding the optimum offset of the tracking target position in this second embodiment of the storage apparatus according to the present invention. In addition, FIGS. 15(a) and 15(b) are diagrams for explaining the process of adding the optimum offset. In FIG. 14, those steps which are the same as those corresponding steps in FIG. 12 are designated by the same reference numerals, and a description thereof will be omitted.

In FIG. 14, if the decision result in the step S37 is YES, a step S51 adds the remaining offset before advancing to the step S39. In addition, after the step S41, a step S52 adds the set offset, and a step S53 advances the process to the step S42 after ending the jump.

Accordingly, the offset is already added at the time of the seek pull-in in the case where the offset will not deteriorate the operating margin of the seek. In addition, in a case where the target offset, that is, the optimum offset which is registered in a memory such as the memory 118, for example, is large, a difference between the offset which is added at the time of the seek pull-in is gradually added after the seek ends.

FIG. 15(a) shows the TES during the seek, and FIG. 15(b) shows the offset which is added by the process of adding the optimum offset of the tracking target position by the seek.

Figure 16:
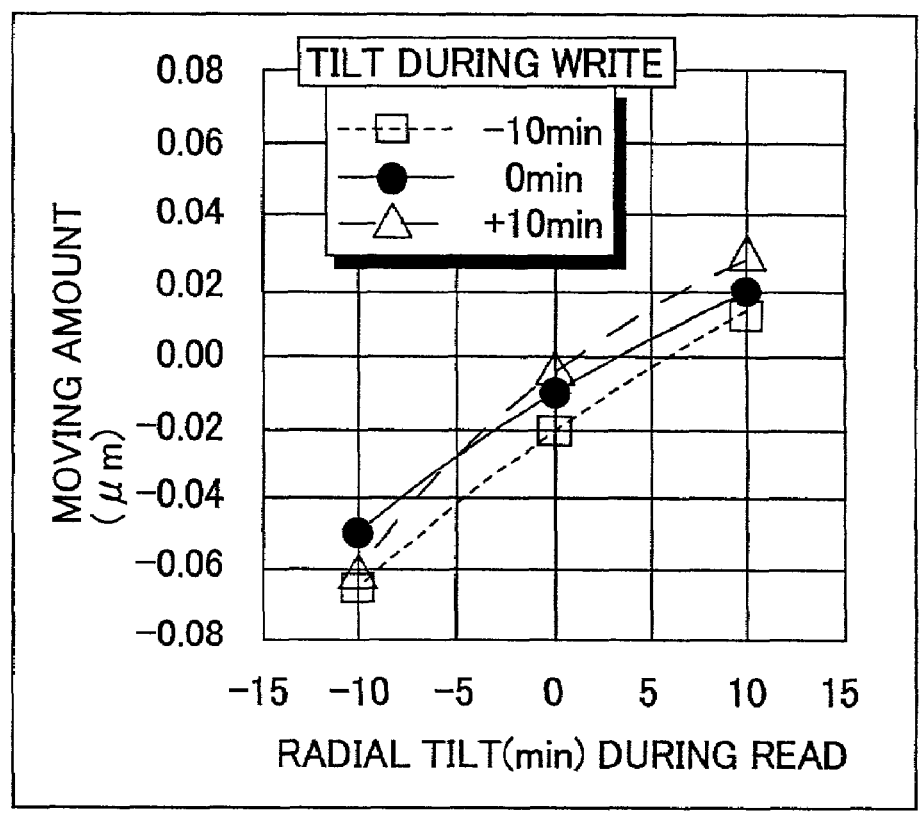
FIG. 16 is a diagram showing a relationship of a radial tilt when recording on a land and a moving amount of an actuator which minimizes the bit error rate.

FIG. 16 is a diagram showing a relationship of a radial tilt when recording on the land of the magneto-optical disk 172 and a moving amount of the track actuator 164 which minimizes the bit error rate (BER) to a minimum (BERmin). In FIG. 16, the ordinate indicates the moving amount ($\mu$m) of the track actuator 164 which minimizes the BER to BERmin, and the abscissa indicates the radial tilt (min) during the read. On the ordinate in FIG. 16, a positive direction indicates the moving amount of the track actuator 164 towards the outer peripheral direction of the magneto-optical disk 172, and a negative direction indicates the moving amount of the track actuator 164 towards the inner peripheral direction of the magneto-optical disk 172. Further, a symbol □ indicates a case where the radial tilt during the write is −10 min, a symbol ● indicates a case where the radial tilt during the write is 0 min, and a symbol Δ indicates a case where the radial tilt during the write is +10 min.

Figure 17:
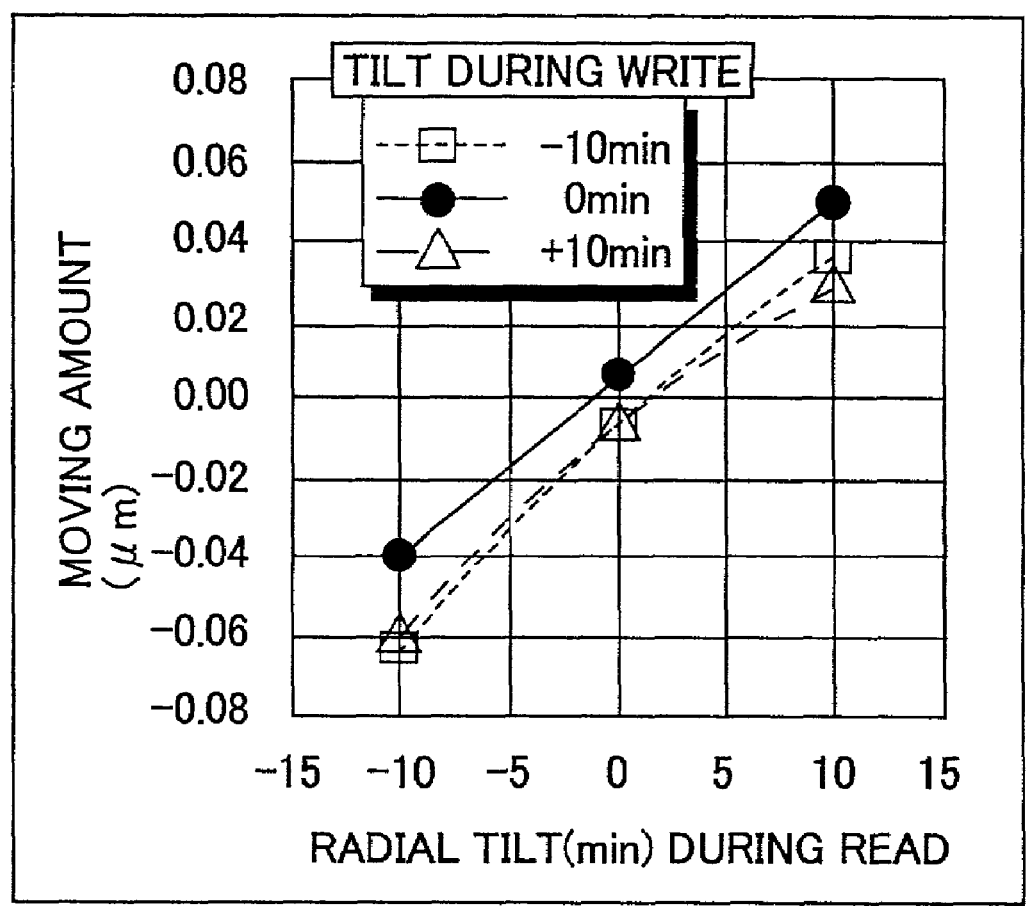
FIG. 17 is a diagram showing a relationship of the radial tilt when recording on a groove and the moving amount of the actuator which minimizes the bit error rate.

FIG. 17 is a diagram showing a relationship of a radial tilt when recording on the groove of the magneto-optical disk 172 and a moving amount of the track actuator 164 which minimizes the bit error rate (BER) to a minimum (BERmin). In FIG. 17, the ordinate indicates the moving amount ($\mu$m) of the track actuator 164 which minimizes the BER to BERmin, and the abscissa indicates the radial tilt (min) during the read. On the ordinate in FIG. 17, a positive direction indicates the moving amount of the track actuator 164 towards the outer peripheral direction of the magneto-optical disk 172, and a negative direction indicates the moving amount of the track actuator 164 towards the inner peripheral direction of the magneto-optical disk 172. Further, a symbol □ indicates a case where the radial tilt during the write is −10 min, a symbol ● indicates a case where the radial tilt during the write is 0 min, and a symbol Δ indicates a case where the radial tilt during the write is +10 min.

Figure 18A:
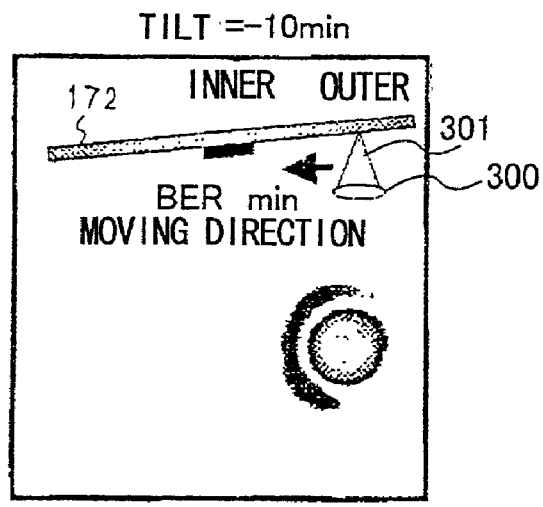
FIGS. 18A, 18B and 18C are diagrams showing a relationship of the radial tilt and a light beam intensity distribution.
Figure 18B:
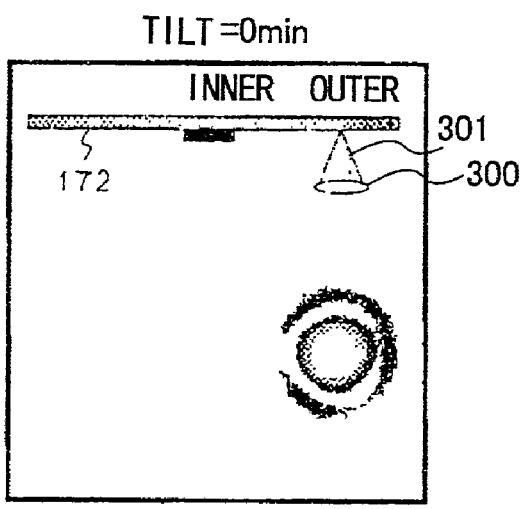
Figure 18C:
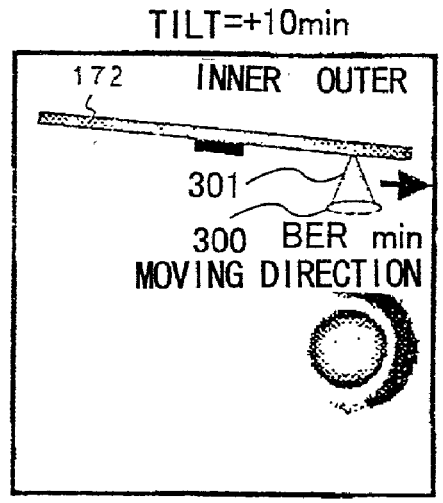

FIGS. 18A, 18B and 18C are diagrams showing a relationship of the radial tilt and a light beam intensity distribution. FIG. 18A shows the light beam intensity distribution for a case where radial tilt during the write is −10 min. FIG. 18B shows the light beam intensity distribution for a case where radial tilt during the write is 0 min. In addition, FIG. 18C shows the light beam intensity distribution for a case where radial tilt during the write is +10 min. In FIGS. 18A, 18B and 18C, the upper part shows the magneto-optical disk 172, an objective lens 300 of the optical head 3, and a light beam 301, while the lower part shows the intensity distribution of the light beam 301 on the magneto-optical disk 172. Moreover, an arrow in FIGS. 18A, 18B and 18C indicates the moving direction of the tracking actuator 164 which makes the BER the minimum (BERmin). It is assumed for the sake of convenience that the optical head 3 uses a laser diode which emits the light beam 301 having a wavelength of 660 nm, and that a numerical aperture (NA) of the objective lens 300 is 0.55. It is also assumed for the sake of convenience that a double mask rear aperture detection (RAD) system is employed.

As may be seen from FIGS. 16 through 18C, the effects of the radial tilt during the write are small compared to the effects of the radial tilt during the read. In addition, it was confirmed that the BER becomes smaller by offsetting (de-tracking) the tracking target position in a direction which increases the intensity of the light beam 301.

In the case described above, it is a precondition that the offset is set in advance at the factory so that the track center becomes the tracking target position, and that this tracking target position is set as the offset zero (0). In addition, when the tilt exists, the tracking target position may become deviated from the track center, and for this reason, the optimum target position is found to add a corresponding offset.

In addition to obtaining the optimum offset based on the error rate, it is of course possible to obtain the optimum offset by monitoring the reproduced signal amplitude or the like.

The measured result obtained in the described embodiments are cleared when the magneto-optical disk 172 is unladed or ejected from the magneto-optical disk unit.

Each of the embodiments described above takes into consideration the compatibility of the storage apparatus according to the present invention and the conventional storage apparatus. In other words, the functions of the present invention are made not to operate with respect to a low-density recording medium having a storage capacity of less than 2.3 GB, for example. But if the compatibility of the storage apparatus according to the present invention and the conventional storage apparatus does not need to be taken into consideration, the functions of the present invention may be made to operate with respect to the low-density recording medium. In this case, the method of judging the type of recording medium is not limited to the method of judging the type from the pits of the ID portion as described above, and it is possible to employ other methods such as a method which reads media information from a control information region of the recording medium.

In addition, the application of the present invention is not limited to the magneto-optical disk unit, and the present invention is similarly applicable to various kinds of storage apparatuses including storage apparatuses which use optical recording media of the magneto-optical, phase change type and the like employing systems different from that described above, and storage apparatuses which use a light beam to record information on a magnetic recording medium as variations in magneto-optical properties.

Further, the present invention is not limited to these embodiments, but various variations and modifications may be made without departing from the scope of the present invention.

What is claimed is:

1. A tracking control method comprising the steps of:
   (a) measuring an optimum offset by measuring a light beam irradiation state of a light beam while offsetting a tracking target position of the light beam on a recording medium so that an optimum light beam irradiation state is obtained at the tracking target position; and
   (b) carrying out a tracking control by setting the optimum offset measured by said step (a),
   wherein said step (a) is carried out in a state where a waveform interference from an adjacent track that is adjacent to a track at the tracking target position is easily generated,
   wherein said step (a) generates the state where the waveform interference from an adjacent track is easily generated by writing data on the adjacent track with a recording power greater than an optimum recording power with which data is recorded on the track at the tracking target position.

2. The tracking control method as claimed in claim 1, further comprising the step of:
   (c) judging a type of the recording medium,
   said step (a) being carried out when said step (c) judges that the recording medium is a high-density recording medium.

3. The tracking control method as claimed in claim 1, wherein said step (a) detects the light beam irradiation state based on one parameter selected from a group consisting of a read error, a reproduced signal amplitude and an amount of focus control.

4. The tracking control method as claimed in claim 1, wherein said step (a) is carried out for every predetermined radial position on the recording medium and/or for every one revolution angle of the recording medium.

5. The tracking control method as claimed in claim 1, wherein said step (a) is carried out when a difference between previous and present measurement execution times is greater than or equal to a prescribed time and/or when a temperature difference between previous and present measurements is greater than or equal to a prescribed temperature.

6. The tracking control method as claimed in claim 1, further comprising:
   (c) carrying out a reproducing process again by changing the optimum offset of the tracking target position in a positive or negative direction, when an error is generated during a reproducing process with respect to the recording medium.

7. The tracking control method as claimed in claim 6, wherein said step (c) changes the optimum offset of the tracking target position in the positive or negative direction depending on a success rate of the reproducing process which is carried out again.

8. The tracking control method as claimed in claim 1, further comprising the step of:
   (c) setting an optimum offset depending on at least one of an object of a seek process and a target address on the recording medium.

9. A storage apparatus comprising:
   offset measurement control means for measuring an optimum offset by measuring a light beam irradiation state of a light beam while offsetting a tracking target position of the light beam on a recording medium so that an optimum light beam irradiation state is obtained at the tracking target position; and
   tracking control means for carrying out a tracking control by setting the optimum offset which is updated,
   wherein said offset measurement control means measures the optimum offset in a state where a waveform interference from an adjacent track that is adjacent to a track at the tracking target position is easily generated,
   wherein said offset measurement control means generates the state where the waveform interference from an adjacent track is easily generated by writing data on the adjacent track with a recording power greater than an optimum recording power with which data is recorded on the track at the tracking target position.

10. The storage apparatus as claimed in claim 9, further comprising:
    judging means for judging a type of the recording medium,
    said offset measurement control means measuring the optimum offset when said step judging means judges that the recording medium is a high-density recording medium.

11. A storage apparatus comprising:
    a measuring section which measures an optimum offset by measuring a light beam irradiation state of a light beam while offsetting a tracking target position of the light beam on a recording medium so that an optimum light beam irradiation state is obtained at the tracking target position; and a control section which carries out a tracking control by setting the optimum offset measured by said measuring section, wherein said measuring section measures the optimum offset in a state where a waveform interference from an adjacent track that is adjacent to a track at the tracking target position is easily generated, wherein said measuring section generates the state where the waveform interference from an adjacent track is easily generated by writing data on the adjacent track with a recording power greater than an optimum recording power with which data is recorded on the track at the tracking target position.

12. The storage apparatus as claimed in claim 11, further comprising:

judging section which judges a type of the recording medium, said measuring section measuring the optimum offset when said judging section judges that the recording medium is a high-density recording medium.

13. The storage apparatus as claimed in claim 11, wherein said measuring section detects the light beam irradiation state based on one parameter selected from a group consisting of a read error, a reproduced signal amplitude and an amount of focus control.

14. The storage apparatus as claimed in claim 11, wherein said measuring section measures the optimum offset for every predetermined radial position on the recording medium and/or for every one revolution angle of the recording medium.

15. The storage apparatus as claimed in claim 11, wherein said measuring section measures the optimum offset when a difference between previous and present measurement execution times is greater than or equal to a prescribed time and/or when a temperature difference between previous and present measurements is greater than or equal to a prescribed temperature.

16. The storage apparatus as claimed in claim 11, further comprising:

a reproducing section which carries out a reproducing process again by changing the optimum offset of the tracking target position in a positive or negative direction, when an error is generated during a reproducing process with respect to the recording medium.

17. The storage apparatus as claimed in claim 16, wherein said reproducing section changes the optimum offset of the tracking target position in the positive or negative direction depending on a success rate of the reproducing process which is carried out again.

18. The storage apparatus as claimed in claim 11, further comprising:

a setting section which sets an optimum offset depending on at least one of an object of a seek process and a target address on the recording medium.

* * * * *